United States Patent
Szajnowski

(10) Patent No.: US 8,471,760 B2
(45) Date of Patent: Jun. 25, 2013

(54) AUTOMOTIVE RADAR WITH RADIO-FREQUENCY INTERFERENCE AVOIDANCE

(75) Inventor: Wieslaw Jerzy Szajnowski, Guildford (GB)

(73) Assignee: Mitsubishi Electric Corporation, Tokyo (JP)

( * ) Notice: Subject to any disclaimer, the term of this patent is extended or adjusted under 35 U.S.C. 154(b) by 120 days.

(21) Appl. No.: 13/116,790

(22) Filed: May 26, 2011

(65) Prior Publication Data

US 2011/0291875 A1    Dec. 1, 2011

(30) Foreign Application Priority Data

May 27, 2010   (EP) .................................... 10164048

(51) Int. Cl.
*G01S 13/00* (2006.01)

(52) U.S. Cl.
USPC ............... 342/70; 342/61; 342/104; 342/107; 342/159

(58) Field of Classification Search
USPC ...................... 342/61, 70, 118, 128
See application file for complete search history.

(56) References Cited

U.S. PATENT DOCUMENTS

| | | | | |
|---|---|---|---|---|
| 4,901,082 A | * | 2/1990 | Schreiber et al. ................ | 342/89 |
| 5,274,380 A | * | 12/1993 | Yatsuka et al. .................. | 342/70 |
| 7,038,608 B1 | | 5/2006 | Gilbert | |
| 7,248,215 B2 | | 7/2007 | Pleva et al. | |
| 7,336,219 B1 | | 2/2008 | Lohmeier et al. | |
| 7,345,619 B2 | | 3/2008 | Hunt | |
| 7,379,018 B1 | | 5/2008 | Lohmeier et al. | |
| 7,400,290 B2 | | 7/2008 | Woodington et al. | |
| 7,403,153 B2 | * | 7/2008 | Kelly et al. ................... | 342/159 |
| 8,223,064 B2 | * | 7/2012 | Szajnowski ..................... | 342/70 |
| 2002/0027522 A1 | | 3/2002 | Tullsson | |
| 2002/0130811 A1 | * | 9/2002 | Voigtlaender et al. ........ | 342/159 |
| 2006/0125682 A1 | * | 6/2006 | Kelly et al. ................... | 342/159 |

(Continued)

FOREIGN PATENT DOCUMENTS

JP    5-240947 A    9/1993

OTHER PUBLICATIONS

Brooker, "Mutual Interference of Millimeter-Wave Radar Systems," IEEE Transactions on Electromagnetic Compatibility, vol. 49, No. 1, Feb. 2007, pp. 170-181.

(Continued)

*Primary Examiner* — John B. Sotomayor
*Assistant Examiner* — Marcus Windrich
(74) *Attorney, Agent, or Firm* — Birch, Stewart, Kolasch & Birch, LLP

(57) ABSTRACT

An automotive radar system to determine a sweep pattern to be transmitted as an output radar waveform in a multiuser transmission environment is disclosed. The system includes: a receiver to receive noise signals; a signal generator to generate a plurality of different frequency sweep signals; a signal combiner to combine each frequency sweep signal with a received noise signal; an interference classifier to identify combined signals corresponding to one or more received noise signals including frequency chirp signals and to determine the respective noise levels of the identified combined signals corresponding to one or more received noise signals including frequency chirp signals; a selector to select a plurality of frequency sweep signals in dependence upon the noise levels determined by the interference classifier; and a control unit to determine a sweep pattern comprising the selected plurality of frequency sweep signals to be transmitted as an output radar waveform.

21 Claims, 16 Drawing Sheets

U.S. PATENT DOCUMENTS

| | | | |
|---|---|---|---|
| 2007/0120731 A1* | 5/2007 | Kelly et al. | .................. 342/159 |
| 2007/0152869 A1 | 7/2007 | Woodington et al. | |
| 2007/0152870 A1 | 7/2007 | Woodington et al. | |
| 2007/0152872 A1 | 7/2007 | Woodington | |
| 2007/0152873 A1 | 7/2007 | Hunt | |
| 2007/0152874 A1 | 7/2007 | Woodington | |
| 2007/0156799 A1 | 7/2007 | Gilbert | |
| 2008/0001809 A1 | 1/2008 | Woodington et al. | |
| 2008/0018523 A1 | 1/2008 | Kelly, Jr. et al. | |

OTHER PUBLICATIONS

De Roo et al., "Sensitivity of the Kurtosis Statistic as a Detector of Pulsed Sinusoidal RFI," IEEE Trans. Geosci. Remote Sens., No. 7, vol. 45, Jul. 2007, pp. 1938-1946.

Fischman et al., "Development and Integration of the Aquarius Scatterometer Processor/Control Electronics for Achieving High Measurement Accuracy," Radar Conference, 2009, IEEE, Piscataway, NJ, USA, May 4, 2009, pp. 1-6, XP-031461558.

International Telecommunications Union Recommendation, ITU-R RS. 1029-2, pp. 1-5, 1994-1997-2003.

Misra et al., "Microwave Radiometer Radio-Frequency Interference Detection Algorithms: A Comparative Study," IEEE Transactions on Geoscience and Remote Sensing, No. 11, vol. 47, Nov. 2009, pp. 3742-3754, XP-011278490.

Niamsuwan et al., "Examination of a simple pulse-blanking technique for radio frequency interference mitigation," Radio Science, vol. 40, RS5S03, 2005, pp. 1-11.

Skou et al., "L-Band RFI as Experienced During Airborne Campaigns in Preparation for SMOS," IEEE Transactions on Geoscience and Remote Sensing, vol. 48, No. 3, Mar. 2010, pp. 1398-1407, XP-011284226.

Zhang et al., "Combating Pulsed Radar Interference in Radio Astronomy," The Astronomical Journal, vol. 126, Sep. 2003, pp. 1588-1594.

* cited by examiner a)

b)

a)

b)

AUTOMOTIVE RADAR WITH RADIO-FREQUENCY INTERFERENCE AVOIDANCE

CLAIM TO PRIORITY

The present application claims priority from European patent application number 10164048.0 filed on 27 May 2010, the full contents of which are incorporated herein by cross-reference.

FIELD OF THE INVENTION

The present invention relates to an automotive radar system and method for use in detecting and suppressing the effects of interference. The disclosed system and method are particularly applicable to improving the resistance of frequency modulated continuous-wave (FMCW) automotive radar to interference caused by other FMCW systems that operate in the same region and share the same frequency band.

BACKGROUND OF THE INVENTION

FIG. 1 is a simplified functional block diagram of conventional frequency modulated continuous-wave (FMCW) automotive radar.

The system comprises a receive antenna RAN 102, a signal conditioning unit SCU 103, a down-converter DCR 104, an analogue-to-digital converter ADC 105, a digital signal processor DSP 106, a timing/control unit TCU 111, a waveform generator WFG 110, a voltage-controlled oscillator VCO 109, acting also as an up-converter, a power amplifier/driver PAR 108 and a transmit antenna TAN 107.

The waveform generator WFG 110 supplies a control signal CV to make the voltage-controlled oscillator VCO 109 produce frequency up-sweeps and down-sweeps. Each resulting waveform SW is amplified in the power amplifier/driver PAR 108 to produce a probing waveform TW. The waveform TW transmitted by the antenna TAN 107 has a constant amplitude but its frequency sweeps the band $\Delta f$ during each up-sweep or down-sweep time interval $T_S$.

The echo RW from an obstacle OBS 101 at range R is an attenuated copy of the transmitted waveform TW, delayed in time by (2R/c), where c is the speed of light.

The echo RW is suitably processed in the signal conditioning unit SCU 103 to produce a representation AR of the reflected signal. The signal AR is combined in the down-converter DCR 104 with a copy SW of the transmitted waveform TW supplied by the voltage-controlled oscillator VCO 109. Output signal BS of the down-converter DCR 104 is first converted to a digital form DS in the analogue-to-digital converter ADC 105, and then sent to the digital signal processor DSP 106.

The digital signal processor DSP 106 receives from the timing/control unit TCU 111 a signal SS indicative of the parameters of each frequency sweep: its start time, sweep duration $T_S$ and swept frequency band $\Delta f$. The signal SS is also used by the waveform generator WFG 110 to produce a required control signal CV.

The digital signal processor DSP 106 determines the range R and velocity V of obstacle OBS 101 by analyzing beat signals BS received from the down-converter DCR 104. A beat signal BS is obtained in response to a corresponding linear frequency sweep SW of the transmitted waveform. TW; the beat frequency being defined as the frequency of a reflected wave RW minus the frequency of a transmitted wave TW.

For a stationary obstacle OBS 101, the beat-frequency magnitude $|f_R|$ is directly proportional to obstacle range R:

$$|f_R| = \left(\frac{|\Delta f|}{T_S}\right)\left(\frac{2 \cdot R}{c}\right) = \frac{2 \cdot |S_F|}{c} \cdot R \qquad \text{Eqn. 1}$$

where $|S_F|=|\Delta f|/T_S$ is the slope of a frequency sweep. The beat frequency $f_R$ is positive for frequency down-sweeps ($S_F<0$), and negative for frequency up-sweeps ($S_F>0$). Discrimination between positive and negative beat frequencies can be accomplished by employing quadrature signal down-conversion.

A relative movement with radial velocity V between the radar and obstacle OBS 101 will modify the 'range-generated' beat frequency $f_R$ by adding a Doppler frequency shift:

$$f_V = \frac{2 \cdot V}{\lambda} \qquad \text{Eqn. 2}$$

where $\lambda$ is the wavelength of transmitted waveform TW. In practice, the value of Doppler shift $f_V$ will not be affected by the amount of swept frequency.

For an obstacle OBS 101 approaching the radar with velocity V, the Doppler shift $f_V$ will be positive, whereas the shift $f_V$ will be negative for an obstacle OBS 101 moving away from the radar. Consequently, the observed beat frequency $f_B$ will result from a combination of the two frequency components, $f_R$, and $f_V$; hence:

$$f_B = -\left(\frac{2S_F}{c}\right) \cdot R + \left(\frac{2}{\lambda}\right) \cdot V \qquad \text{Eqn. 3}$$

It is noted that the slope $S_F$ itself can be negative (for a down-sweep) or positive (for an up-sweep).

In the case of a single moving obstacle OBS 101, at least two frequency sweeps with substantially different slopes $S_F$ will be required to determine in a unique way both the range R and the relative velocity V of the obstacle. However, when there are two or more obstacles present in the radar's field of view (FOV), more frequency sweeps with distinct slopes will be needed to correctly determine the range and velocity of each obstacle.

From the above discussion it follows that information about ranges and velocities of obstacles is contained in the frequency components of a plurality of beat signals, each such beat signal being obtained in response to a corresponding frequency sweep transmitted by the radar.

Consequently, reliable frequency estimation carried out by the digital signal processor DSP is of primary importance.

An analysis presented in: G. M. Brooker, "Mutual Interference of Millimeter-Wave Radar Systems," *IEEE Trans. Electrarnagn. Compat.*, pp. 170-181, February 2007, has shown that the sweep patterns and associated signal processing techniques commonly used in automotive radar are all susceptible to multiuser interference.

Known automotive FMCW radar systems operating in multiuser environments therefore provide unreliable obstacle detection and poor estimation of ramie and velocity due to the problems caused by multiuser interference.

SUMMARY OF INVENTION

The present inventor has realised that the estimation of range and velocity in an automotive FMCW radar system can be improved dramatically by discriminating man-made interference from interference of natural origin and then taking steps to avoid and/or suppress the man-made interference.

In general, the present invention therefore provides an automotive radar system that is operable to process a received signal to identify interference comprising a frequency chirp (that is, man-made noise) and is further operable to set the frequency sweep signals to be used for the transmission of an output radar waveform so as to at least partially avoid transmitting at frequencies with which the identified frequency chirp will interfere.

More particularly, there is provided an automotive radar system operable to determine a sweep pattern to be transmitted as an output radar waveform in an environment with other sources of man-made signals, the system comprising: a receiver operable to receive noise signals comprising background noise or a combination of background noise and interference signals from one or more other sources; a signal generator operable to generate a plurality of different frequency sweep signals; a signal processor operable to process each frequency sweep signal with a received noise signal to generate a processed signal for each frequency sweep signal; an interference classifier operable to detect processed signals corresponding to one or more received noise signals comprising interference signals from another source and to determine the respective noise levels of the identified processed signals corresponding to one or more received noise signals comprising interference signals from another source; a selector operable to select a plurality of the frequency sweep signals in dependence upon the noise levels determined by the interference classifier; and a control unit operable to determine a sweep pattern for an output radar waveform to be transmitted based on the selected plurality of frequency sweep signals.

Preferably, the automotive radar system further comprises means for changing the operation of the automotive radar system between a passive mode and an active mode; wherein: in the passive mode, the automotive radar system is arranged to determine a sweep pattern for an output waveform from one or more received noise signals; and in the active mode, the automotive radar system is arranged to transmit an output waveform comprising the frequency sweep pattern determined in a passive mode of operation and to process received signals comprising a reflection of the transmitted output waveform.

Preferably, the automotive radar system further comprises: storage means configured to store frames of data with each frame corresponding to a processed signal for a respective frequency sweep signal; and a blanking circuit operable to apply signal blanking to the data of a frame; wherein: in the active mode, the blanking circuit is operable to process a frame corresponding to a processed signal for a frequency sweep signal to slice the frame into data blocks of predetermined size, to determine levels of the data blocks within the frame and, if the level of a data block is above a predetermined level, then to apply blanking to the data block; and the automotive radar system is arranged to detect at least one of the range and velocity of an object in dependence upon one or more frames with blanking applied to them.

Preferably, the interference classifier is operable to process samples of a processed signal for each frequency sweep signal, and the interference classifier comprises: a scale factor calculator operable to use the signal samples to calculate a scale factor for the processed signal; a normalises operable to calculate normalised signal samples, y, by using the scale factor to normalise the signal samples; a nonlinear transformer operable to perform a nonlinear transform, T(y), on the normalised signal samples to calculate transformed signal samples; an averaging circuit operable to calculate an average of the transformed signal samples; and a comparator operable to compare the calculated average of the transformed signal samples to a predetermined threshold level in order to determine whether the type of noise present in the processed signal comprises an interference signal from a multiuser environment (i.e. to determine whether the type of noise present is a frequency chirp signal; wherein: the nonlinear transformer is operable to perform a nonlinear transform, T(y), comprising a combination of a first function, T1(y), and a second function, T2(y), wherein the first function defines the transform to be applied to normalised signal samples having a value not exceeding a transition value, $y_t$, and the second function defines a transform to be applied to normalised signal samples having a value at or above the transition value $y_t$, and wherein: T1(y) is a non-decreasing function with increasing normalised signal sample values; T2(y) is a decreasing function with increasing normalised signal sample values; and the transition value, $y_t$, has a value in the range $1.3 \leq y_t \leq 1.7$.

Preferably, the first function, T1(y), is an increasing function with increasing normalised signal sample values, and the magnitude of the mean slope of T1(y) less than the magnitude of the mean slope of T2(y).

Preferably, the scale factor calculator of the interference classifier is operable to calculate a scale factor that is the mean absolute deviation of the signal samples; and the nonlinear transformer is operable to perform a nonlinear transform, T(y), comprising a combination of a first function, T1(y), and a second function, T2(y), which jointly approximate a ratio of the conditional probabilities p(y|N1) and p(y|N2), where:

$$p(y|N1) = \frac{2}{\pi}\exp\left(-\frac{y^2}{\pi}\right), y \geq 0;$$

p(y|N2) is a representation of the function $$\frac{4}{\pi\sqrt{\pi^2 - 4y^2}}, 0 \leq y \leq \frac{\pi}{2},$$

dependent upon noise level; and

N1 is burst noise and N2 is interference comprising a frequency chirp signal.

Preferably, the scale factor calculator of the interference classifier is operable to calculate a scale factor that is the standard deviation of the signal samples; and the nonlinear transformer is operable to perform a nonlinear transform, T(y), comprising a combination of a first function, T1(y), and a second function, T2(y), which jointly approximate a ratio of the conditional probabilities p(y|N1) and p(y|N2), where:

$$p(y|N1) = \sqrt{\frac{2}{\pi}}\exp\left(-\frac{y^2}{2}\right), y \geq 0;$$

p(y|N2) is a representation of the function $$\frac{2}{\pi\sqrt{2 - y^2}},$$

$0 \leq y \leq \sqrt{2}$, dependent upon noise level; and

N1 is burst noise and N2 is interference comprising a frequency chirp signal.

Preferably, the scale factor calculator of the interference classifier is operable to calculate one of the mean absolute deviation, the standard deviation, the geometric mean, median and trimmed mean of the signal samples as the scale factor.

Preferably, the normaliser of the interference classifier is operable to determine a magnitude of each signal sample and is operable to calculate the normalised signal samples, y, by dividing the magnitudes of the signal samples by the scale factor.

Preferably, the nonlinear transformer of the interference classifier is operable to perform a nonlinear transform in which the first function T1(y) comprises a Lorentz function and the second function T2(y) comprises a parabola.

Preferably, the scale factor calculator and the nonlinear transformer are operable to calculate a plurality of different types of scale factors and apply a plurality of different nonlinear transforms, respectively, and the scale factor calculator and nonlinear transformer are configured to select between the different types of scale factors and the different nonlinear transforms, in dependence upon an input control signal defining a type of normalisation to be applied for a noise signal under test.

Preferably, the process of detecting a processed signal comprises the process of outputting a signal that indicates the level of the noise being classified.

The present invention also provides a method of determining a sweep pattern to be transmitted as an output radar waveform by an automotive radar in an environment of multiple interference sources, the method comprising the processes of: receiving one or more noise signals comprising background noise or a combination of background noise and interference signals from one or more other sources in the environment; generating a plurality of different frequency sweep signals; processing each frequency sweep signal with a received noise signal to generate a processed signal for each frequency sweep signal; detecting processed signals corresponding to one or more received noise signals comprising interference signals from another source and determining the respective noise level of each detected processed signal corresponding to a received noise signal comprising interference signals from another source; selecting a plurality of the frequency sweep signals in dependence upon the determined noise levels of the processed signals corresponding to the one or more received noise signals comprising interfering signals from another source; and determining a sweep pattern for an output radar waveform to be transmitted in dependence upon the selected plurality of frequency sweep signals.

Preferably, the method further comprises the process of switching between a passive mode and an active mode; wherein: in the passive mode, a sweep pattern for an output waveform is determined from one or more received noise signals; and in the active mode, an output waveform comprising a frequency sweep pattern determined in a preceding passive mode operation is transmitted and received signals comprising a reflection of the transmitted output waveform are processed.

Preferably, the active mode includes the processes of: storing frames of data with each frame corresponding to a processed signal for a respective frequency sweep signal; processing a frame corresponding to a processed signal for a frequency sweep signal to slice the frame into data blocks, to determine levels of the data blocks within the frame and, if the level of a data block is above a predetermined level, then to apply blanking to the data of the data block; and detecting at least one of the range and velocity of an object in dependence upon at least one frame with blanking applied to it.

Preferably, the classification process of detecting a processed signal corresponding to a received noise signal comprising interference signals from a multiuser environment comprises: using signal samples of the processed signal to calculate a scale factor for the processed signal; calculating normalised signal samples, y, by using the scale factor to normalise the received signal samples; performing a nonlinear transform, T(y), on the normalised signal samples, y, to calculate transformed signal samples; calculating an average of the transformed signal samples: and comparing the calculated average of the transformed signal samples to a predetermined threshold level in order to determine whether the type of noise present in the processed signal comprises an interference signal from a multiuser environment (i.e. to determine whether the type of noise present is a frequency chirp signal); wherein: the nonlinear transform, T(y), comprises a combination of a first function, T1(y), and a second function, T2(y), wherein the first function defines the transform to be applied to normalised signal samples having a value not exceeding a transition value, $y_t$, and the second function defines a transform to be applied to normalised signal samples having a value at or above the transition value $y_t$, and wherein: T1(y) is a non-decreasing function with increasing normalised signal sample values; T2(y) is a decreasing function with increasing normalised signal sample values; and the transition value, $y_t$, has a value in the range $1.3 \leq y_t \leq 1.7$.

Preferably, in the classification process, the first function T1(y) is an increasing function with increasing normalised signal sample values, and the magnitude of the mean slope of T1(y) is less than the magnitude of the mean slope of T2(y).

Preferably, in the classification process, the scale factor is the mean absolute deviation of the signal samples; and the nonlinear transform, T(y), comprises a combination of a first function, T1(y), and a second function, T2(y), which jointly approximate a ratio of the conditional probabilities P(y|N1) and p(y|N2), where:

$$p(y|N1) = \frac{2}{\pi} \exp\left(-\frac{y^2}{\pi}\right), y \geq 0;$$

p(y|N2) is a representation of the function $$\frac{4}{\pi\sqrt{\pi^2 - 4y^2}}, 0 \leq y < \frac{\pi}{2},$$

dependent upon noise level; and

N1 is burst noise and N2 is interference comprising a frequency chirp signal.

Preferably, in the classification process, the scale factor is the standard deviation of the signal samples; and the nonlinear transform, T(y), comprises a combination of a first function, T1(y), and a second function, T2(y), which jointly approximate a ratio of the conditional probabilities p(y|N1) and p(y|N2), where:

$$p(y|N1) = \sqrt{\frac{2}{\pi}} \exp\left(-\frac{y^2}{2}\right), y \geq 0;$$

p(y|N2) is a representation of the function $$\frac{2}{\pi\sqrt{2-y^2}},$$

$0 \leq y \leq \sqrt{2}$, dependent upon noise level; and

N1 is burst noise and N2 is interference comprising a frequency chirp signal.

Preferably, the process of using the signal samples to calculate a scale factor comprises calculating one of the mean absolute deviation, the standard deviation, the geometric mean, median and trimmed mean of the signal samples as the scale factor.

Preferably, the process of calculating normalised signal samples comprises determining a magnitude of each signal sample and calculating the normalised signal samples by dividing the magnitudes of the signal samples by the scale factor.

Preferably, in the process of performing a nonlinear transform, the first function T1(y) of the nonlinear transform comprises a Lorentz function and the second function T2(y) of the nonlinear transform comprises a parabola.

The present invention also provides a computer program product, such as a storage medium, storage device or a signal, carrying computer program instructions to program a programmable processing apparatus to become operable to perform a method as set out above.

LIST OF FIGURES

Figure 3:
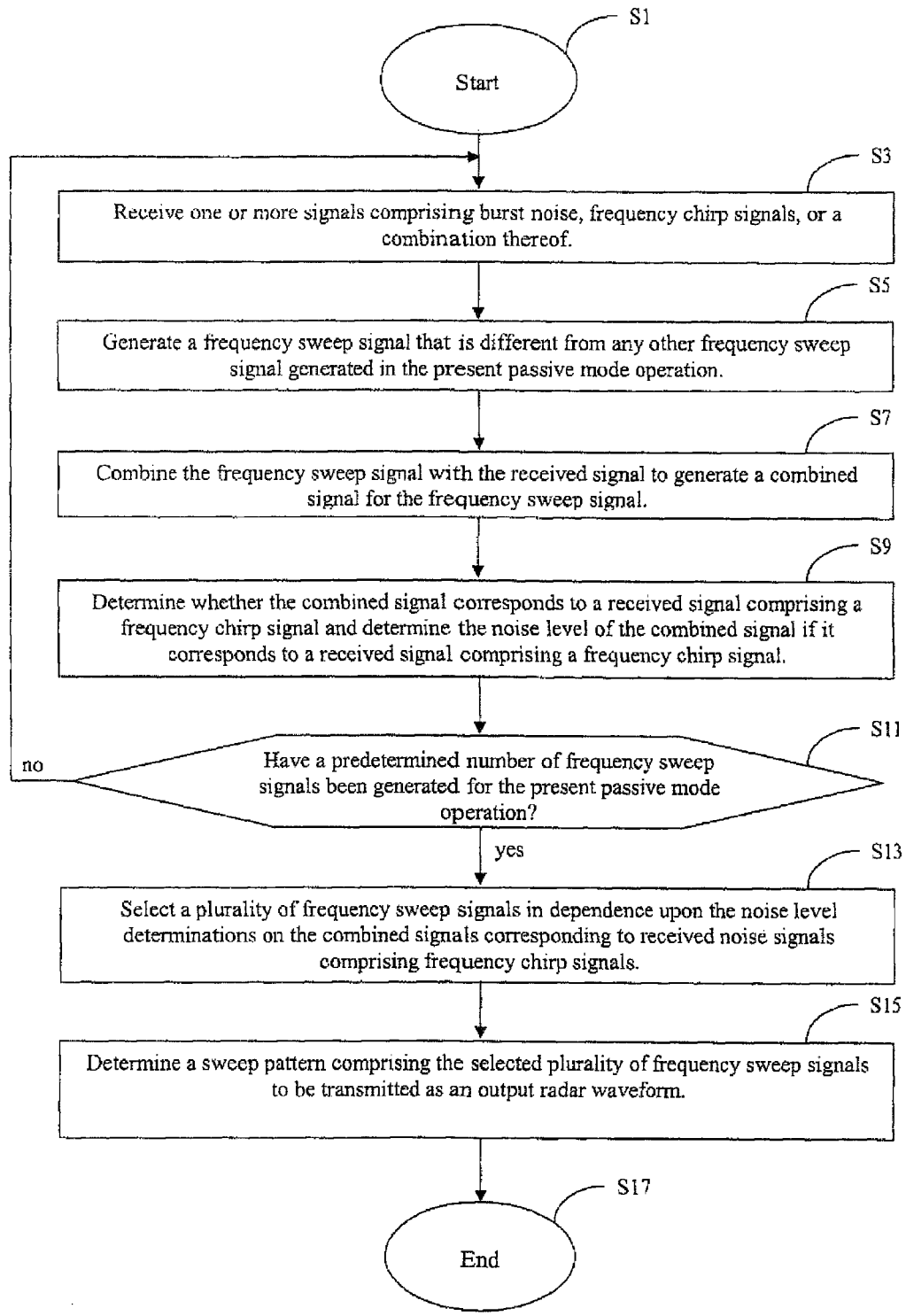
Figure 3:
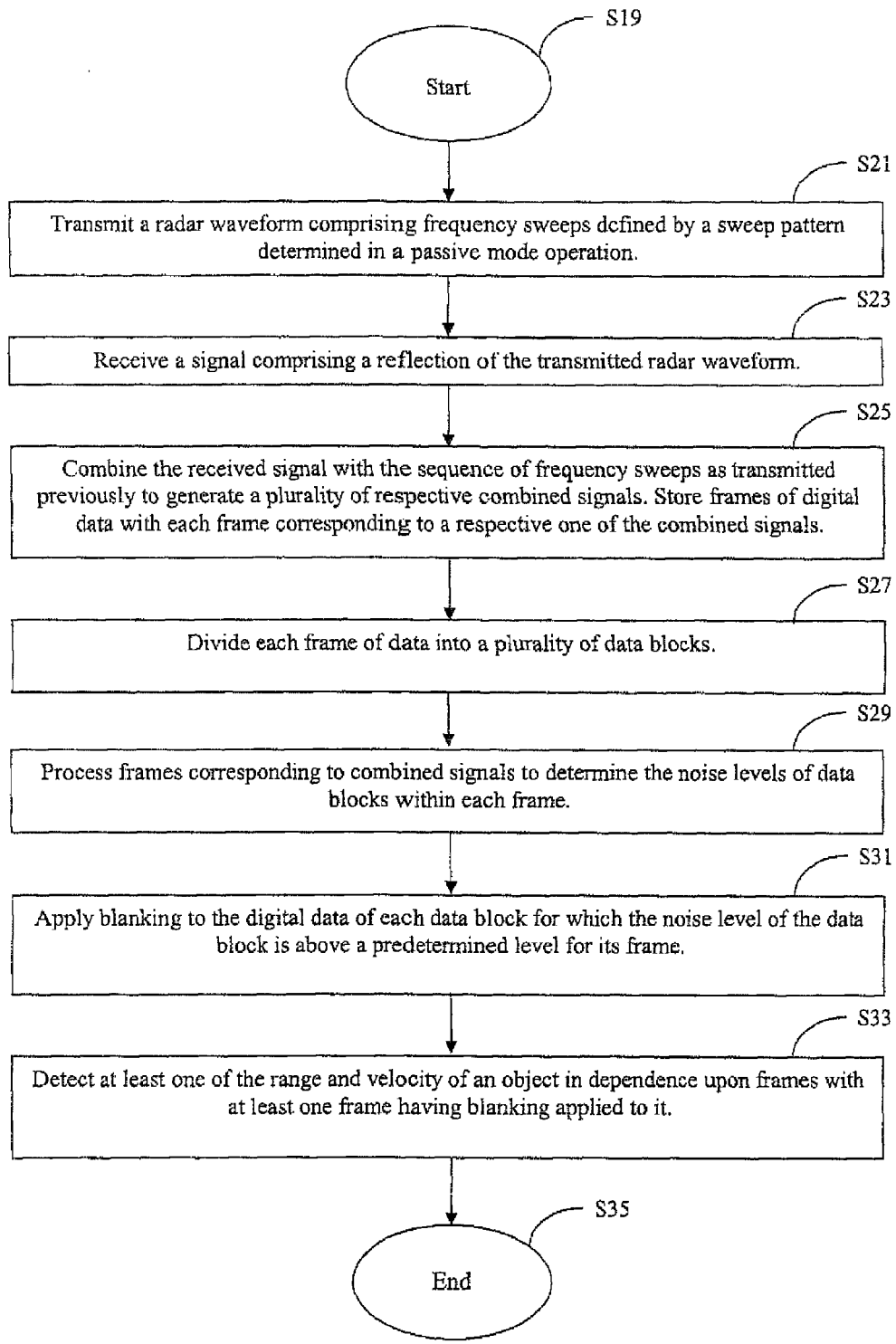

FIG. 3a) is a flow chart showing a method performed in a passive mode to determine a plurality of frequency sweep signals for transmission according to an embodiment of the invention.

FIG. 3b) is a flow chart showing a method performed in an active mode to transmit and process a received signal according to an embodiment of the invention.

Figure 4:
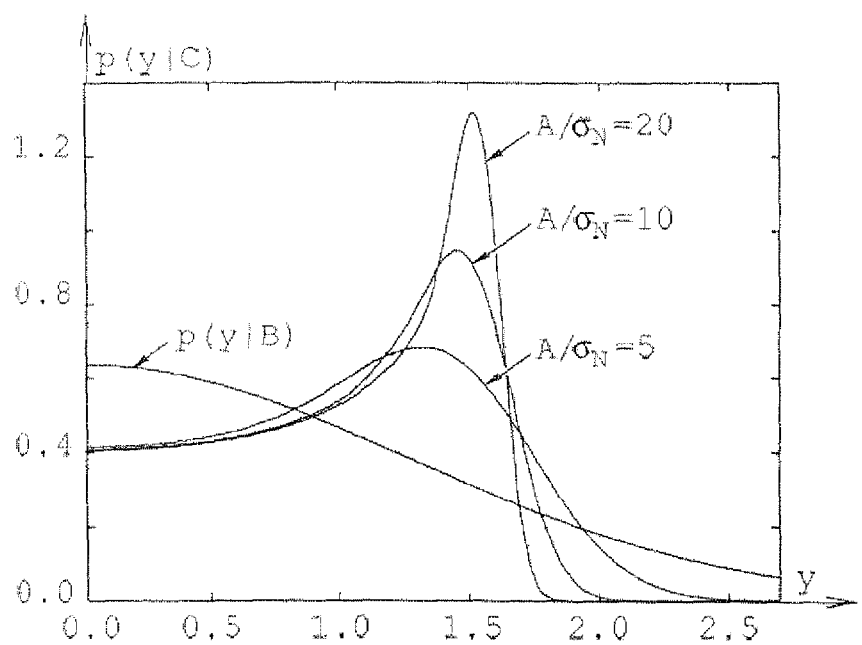

FIG. 4 depicts the shapes of the probability density function p(y|C) of the amplitude of a sine wave corrupted by noise and the probability density function p(y|B) of the noise magnitude.

Figure 5:
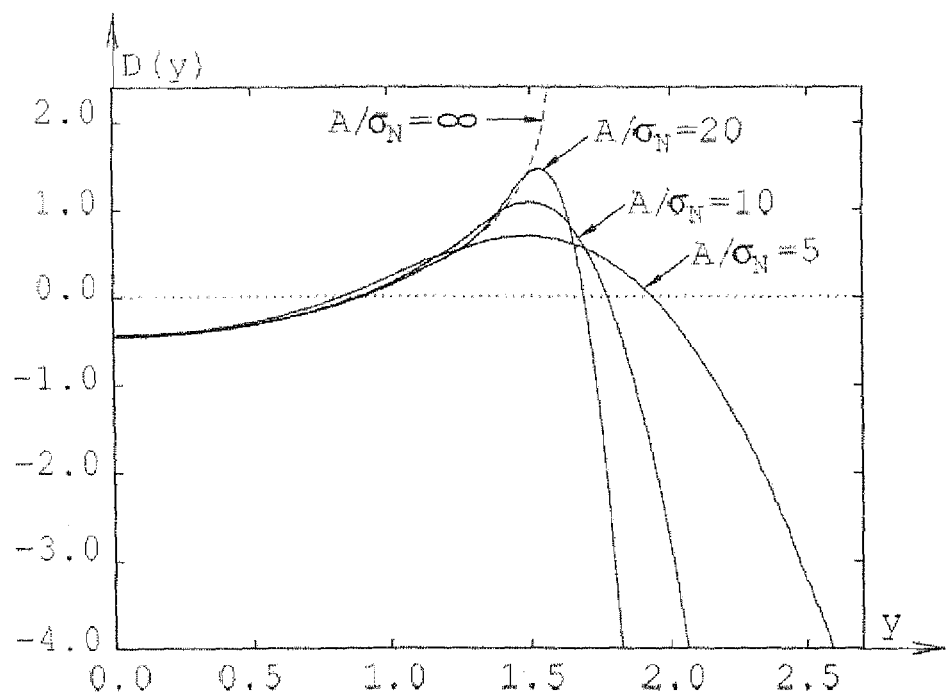

FIG. 5 shows the shapes of the nonlinearity D(y) utilised in a robust version of an interference classifier for use in an automotive radar system in accordance with an embodiment of the invention.

Figure 6:
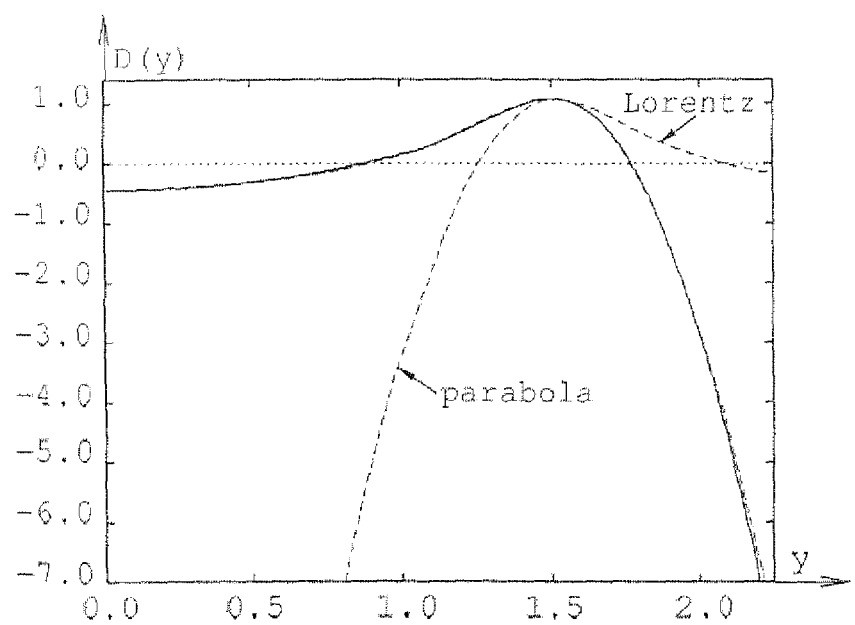

FIG. 6 depicts a nonlinearity D(y) and also its approximation utilised in a robust version of an interference classifier for use in an automotive radar system in accordance with an embodiment of the invention.

Figure 7:
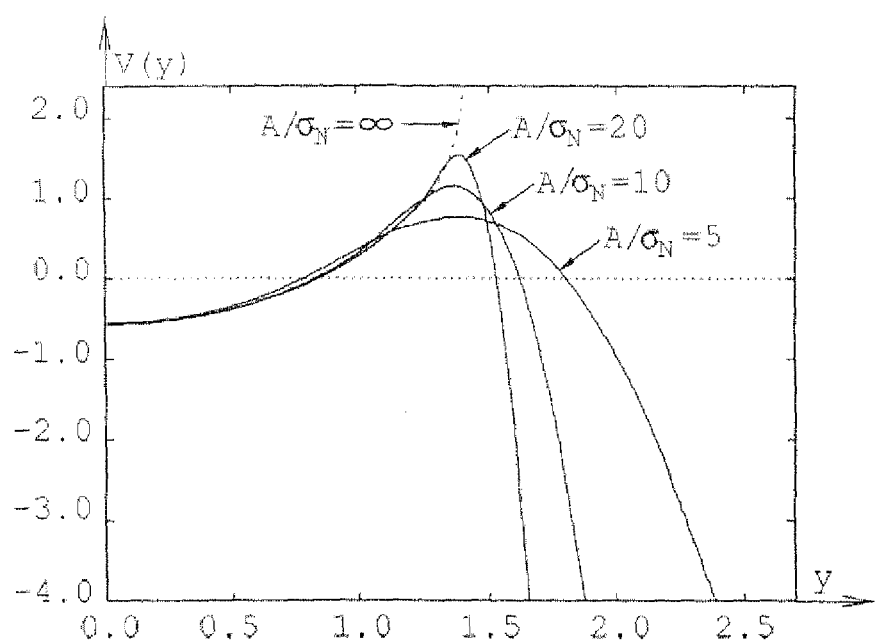

FIG. 7 shows the shapes of the nonlinearity V(y) utilised in an optimal version of an interference classifier for use in an automotive radar in accordance with an embodiment of the invention.

Figure 8:
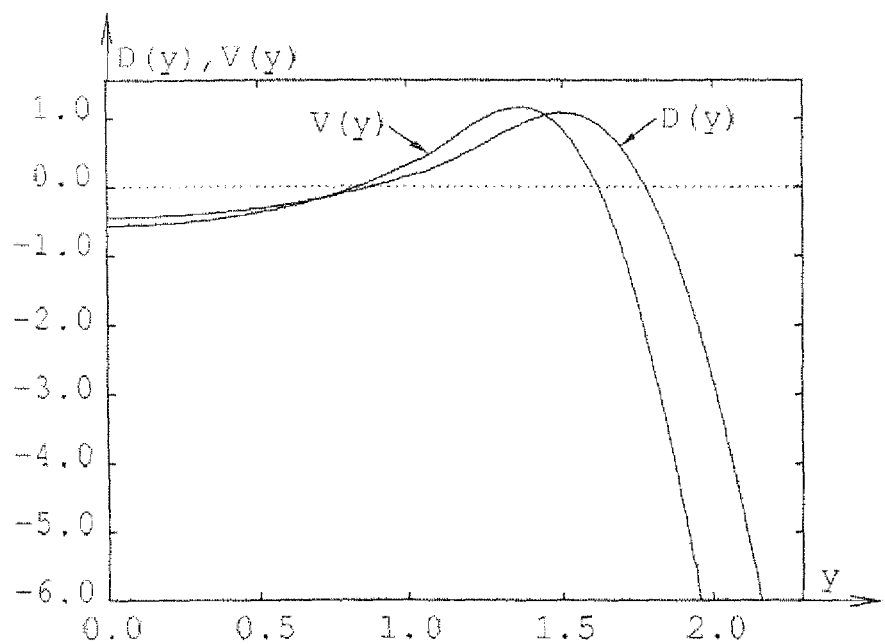

FIG. 8 depicts a nonlinearity D(y) utilised in a robust version along with a nonlinearity V(y) utilised in an optimal version of an interference classifier for use in an automotive radar in accordance with an embodiment of the invention.

Figure 9:
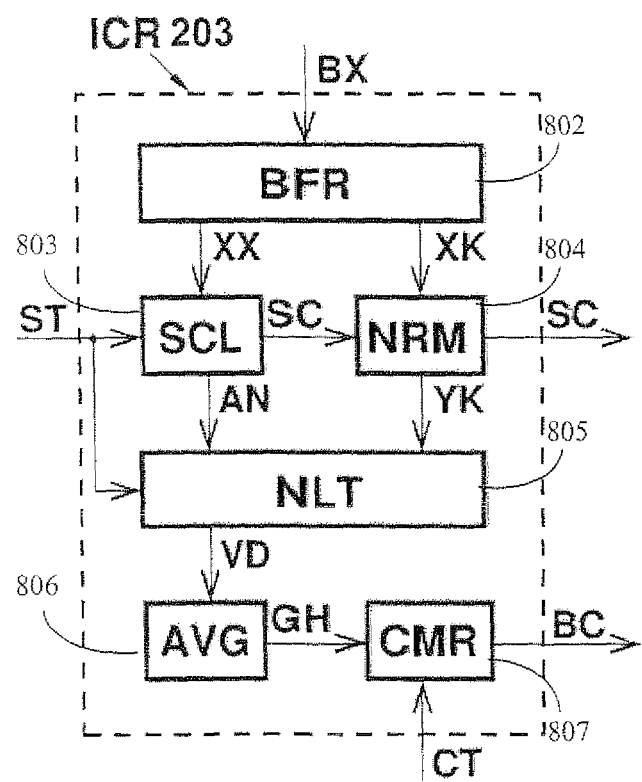

FIG. 9 is a functional block diagram of an interference classifier for use in an automotive radar system in accordance with an embodiment the invention.

Figure 10:
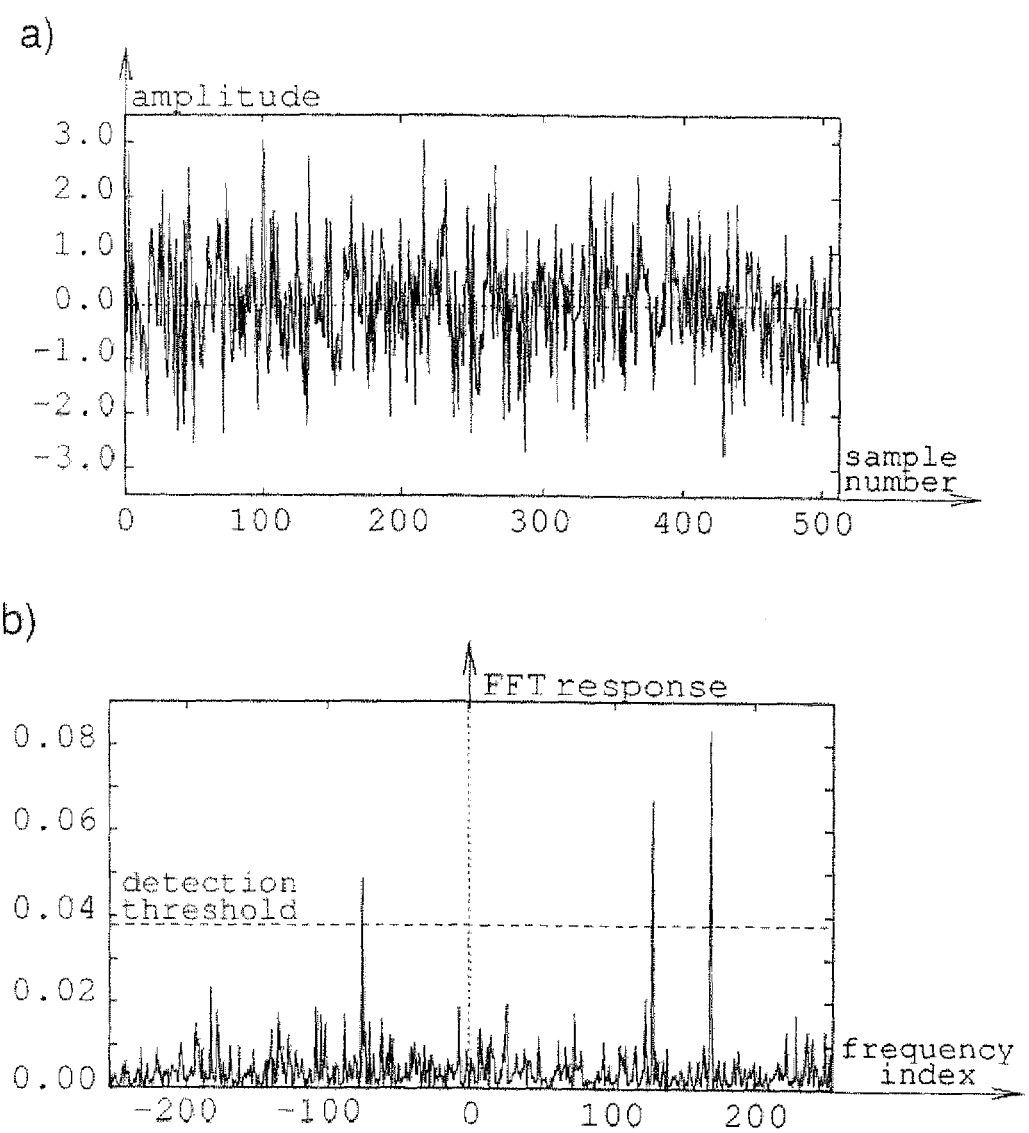

FIG. 10a) is a data frame comprising three sine waves corrupted by background noise.

FIG. 10b) is a frequency-domain representation of the data frame of FIG. 10a).

Figure 11:
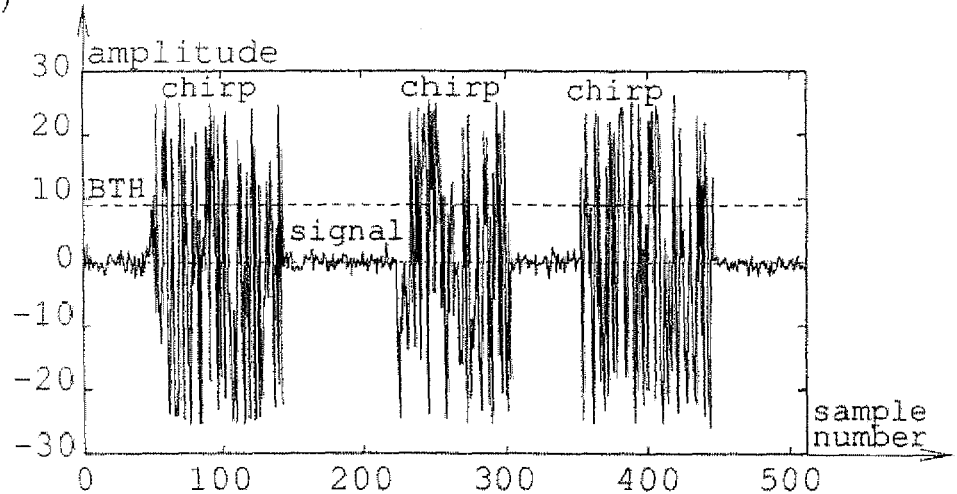
Figure 11:
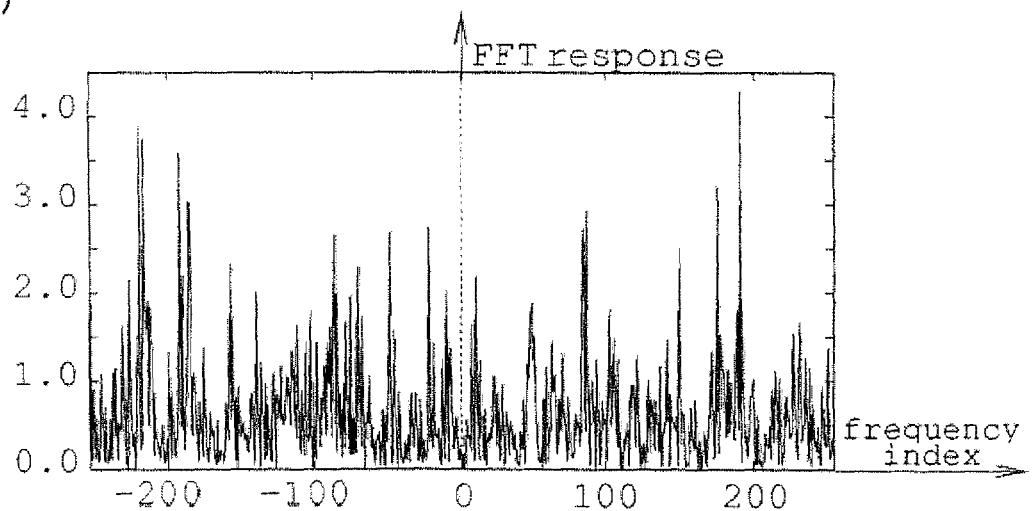

FIG. 11a) is a data frame comprising three sine waves corrupted by background noise and additionally by three high-level frequency chirps.

FIG. 11b) is a frequency-domain representation of the data frame of FIG. 11a).

Figure 12:
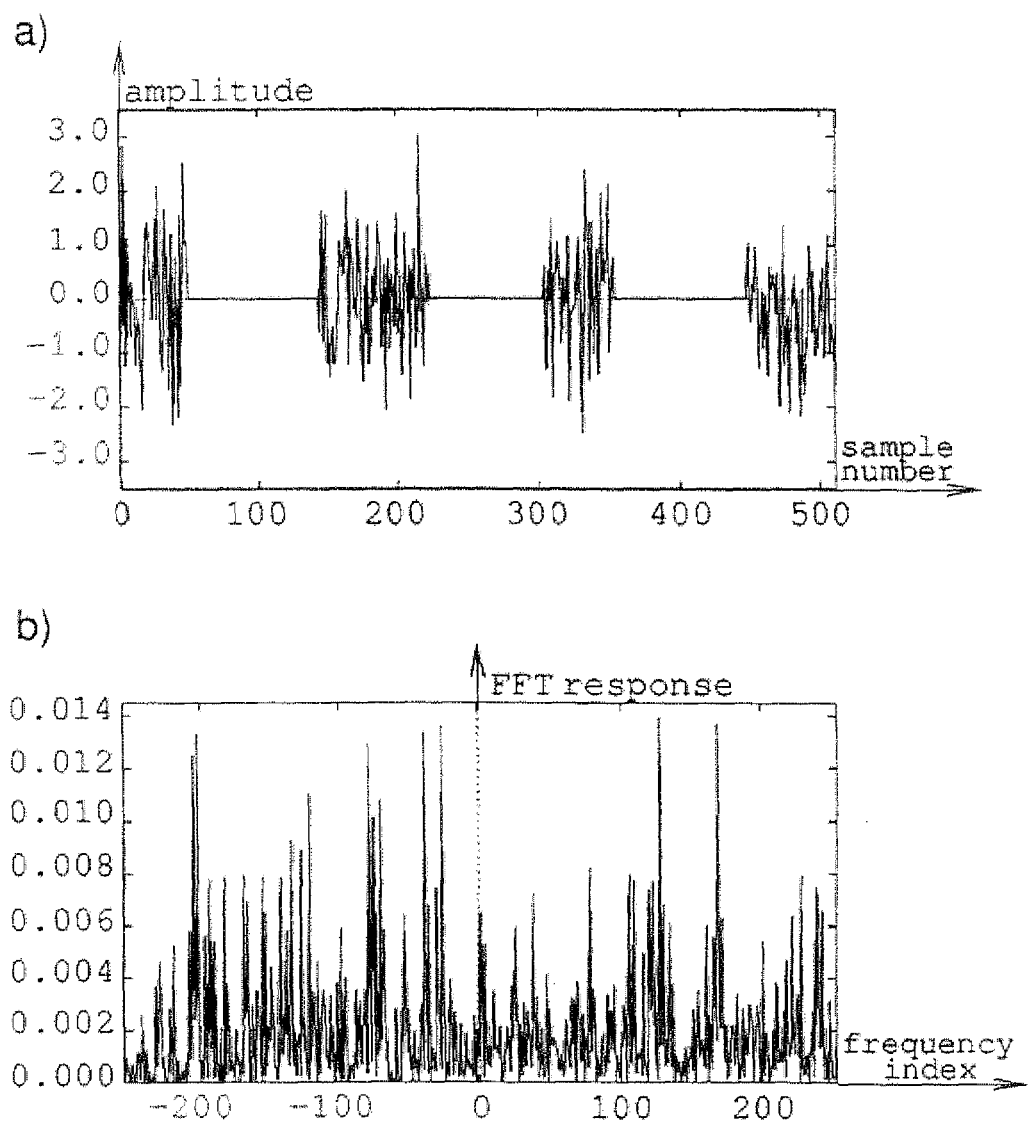

FIG. 12a) is a modified (by blanking) data frame comprising three sine waves corrupted by background noise and additionally by three high-level frequency chirps.

FIG. 12b) is a frequency-domain representation of the data frame of FIG. 12a).

Figure 13:
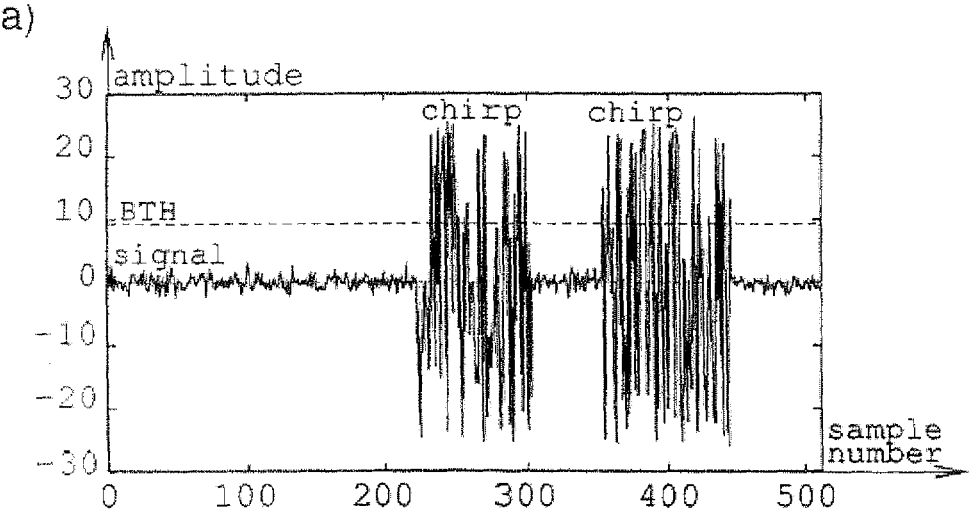
Figure 13:
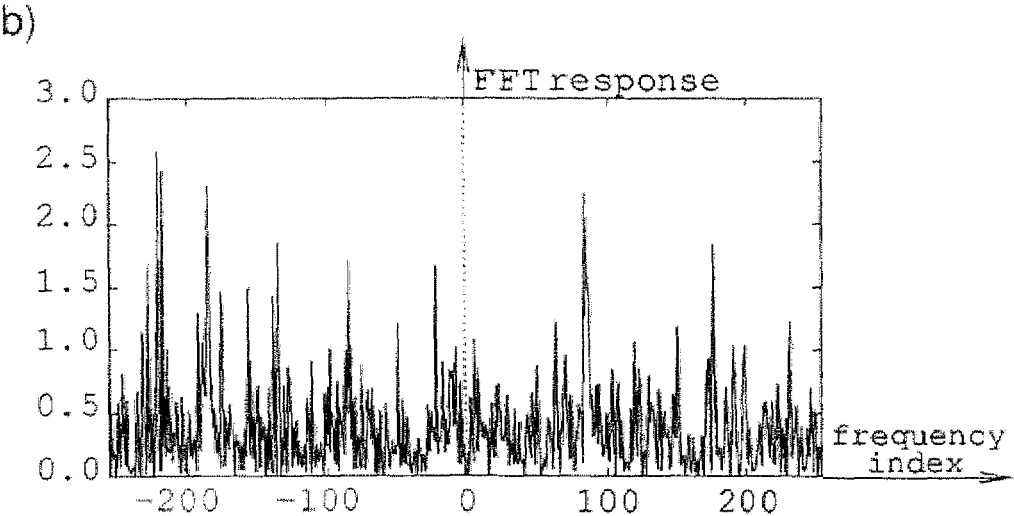

FIG. 13a) is a data frame comprising three sine waves corrupted by background noise and additionally by two high-level frequency chirps.

FIG. 13b) is a frequency-domain representation of the data frame of FIG. 13a).

Figure 14:
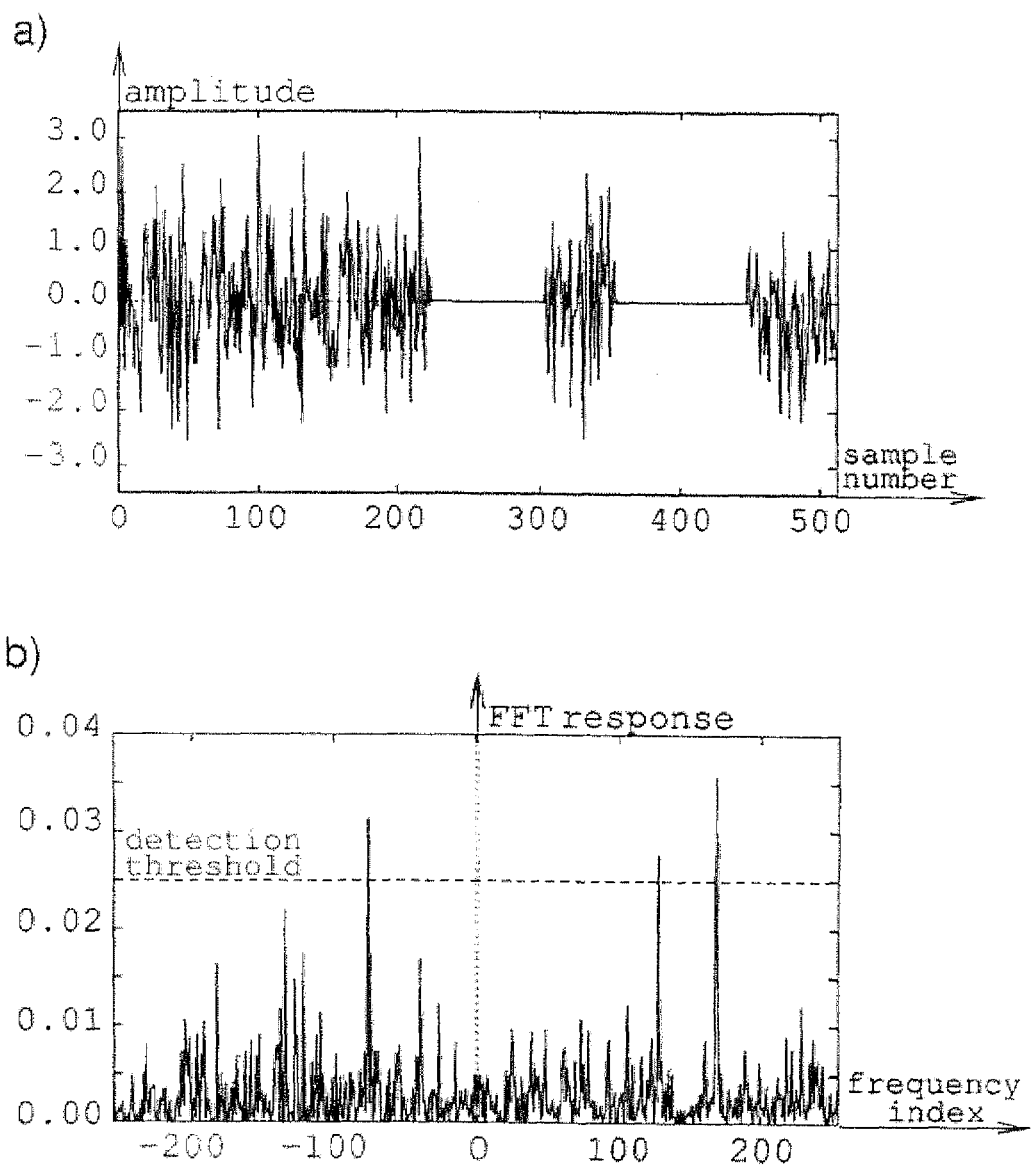

FIG. 14a) represents a modified (by blanking) data frame comprising three sine waves corrupted by background noise and additionally by two high-level frequency chirps.

FIG. 14b) is a frequency-domain representation of the data frame of FIG. 14a).

Figure 15:
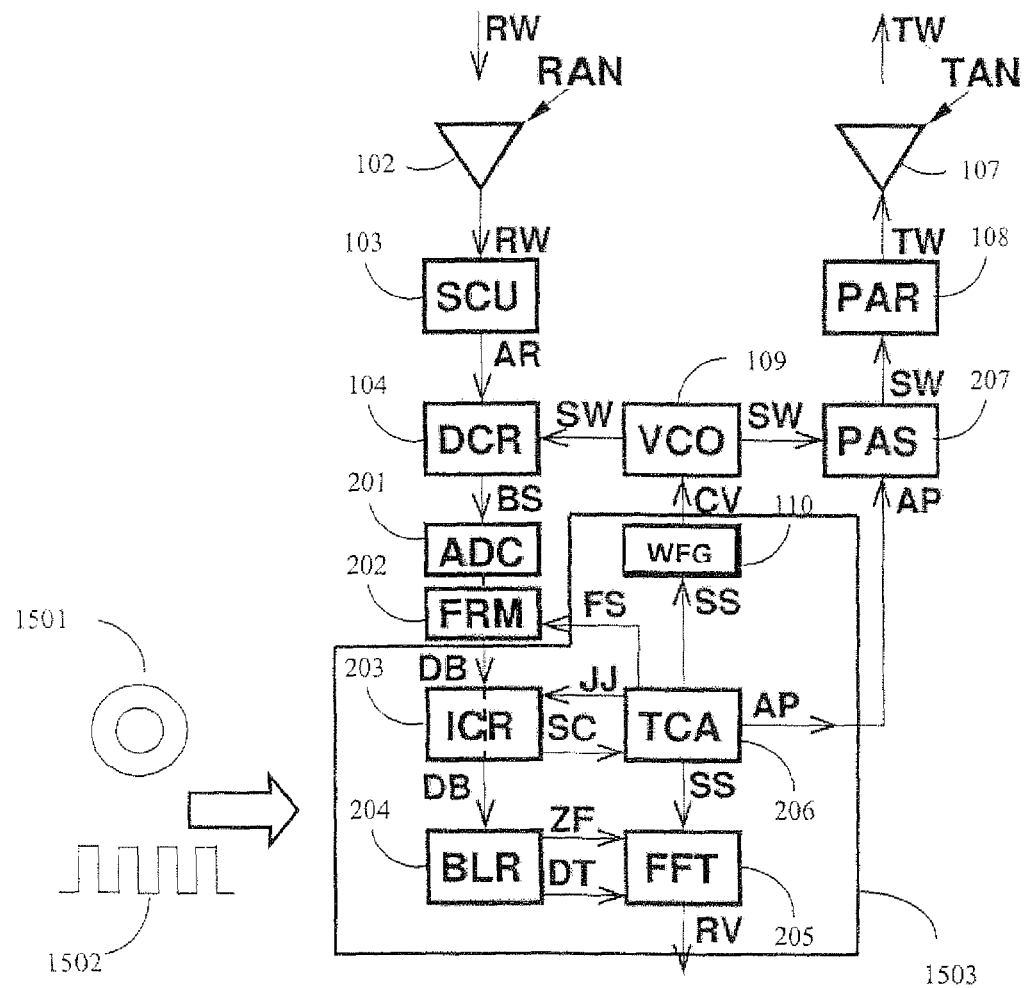

FIG. 15 shows an embodiment of an FMCW automotive radar system implemented using computer program instructions.

DESCRIPTION OF EMBODIMENTS

As will be described below, embodiments of the present invention make use of the inventor's realisation that, in general, many man-made transmissions have a form of a pulsed sine-wave carrier modulated in phase or frequency. Discrete-time samples of such a signal obtained from asynchronous sampling will have the same statistical properties as those of a sampled sine wave with a random phase. On the other hand, in general, signals generated by natural phenomena may be represented by a random Gaussian process. This is exploited to provide an automotive radar system with an interference classifier to decide whether an observed signal represents a Gaussian random process or a noisy sine wave with varying phase, such as a frequency chirp. When a frequency chirp caused by a man-made transmission other than a transmission from the own automotive radar system itself is detected, the automotive radar system selects frequency sweep signals to generate an output radar waveform which avoid, or at least partially avoid, interference from the detected frequency chirp. Furthermore, the detected frequency chirp is used to guide a pulse-blanking operation to suppress the interference effect of the detected frequency chirp.

Figure 2:
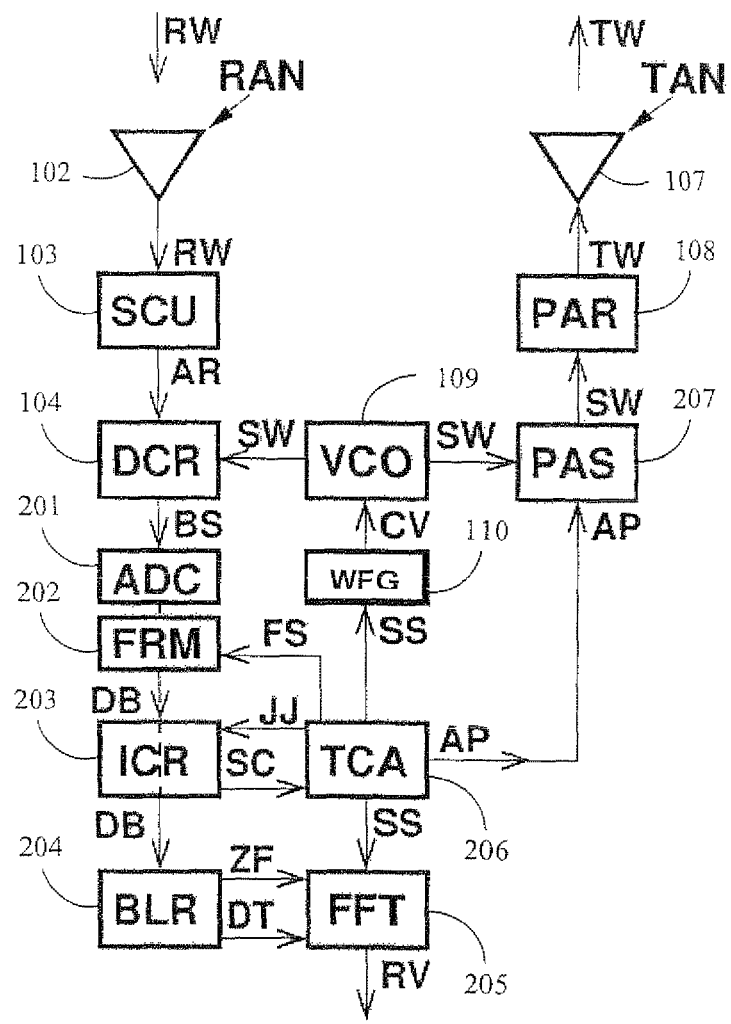
FIG. 2 is a functional block diagram of an FMCW automotive radar system incorporating an interference classifier in accordance with an embodiment of the invention.

FIG. 2 is a simplified functional block diagram of an FMCW automotive radar system in accordance with an embodiment of the invention.

The automotive radar system comprises the following blocks:
 a receive antenna RAN 102
 a signal conditioning unit SCU 103
 a down-converter DCR 104
 an analogue-to-digital converter ADC 201
 a Fourier signal processor FFT 205
 a timing/control/arithmetic unit TCA 206
 a waveform generator WFG 110
 a voltage-controlled oscillator VCO 109
 a power amplifier/driver PAR 108
 a transmit antenna TAN 107
 a mode switch PAS 207 a buffer/slicer FRM 202
an interference classifier ICR 203
a blanking circuit BLR 204.

The FMCW automotive radar is arranged to operate alternately in two modes: passive and active.

The purpose of the passive mode is to dynamically and adaptively select a frequency sweep pattern that will not be excessively disrupted by multiuser interference.

Figure 1:
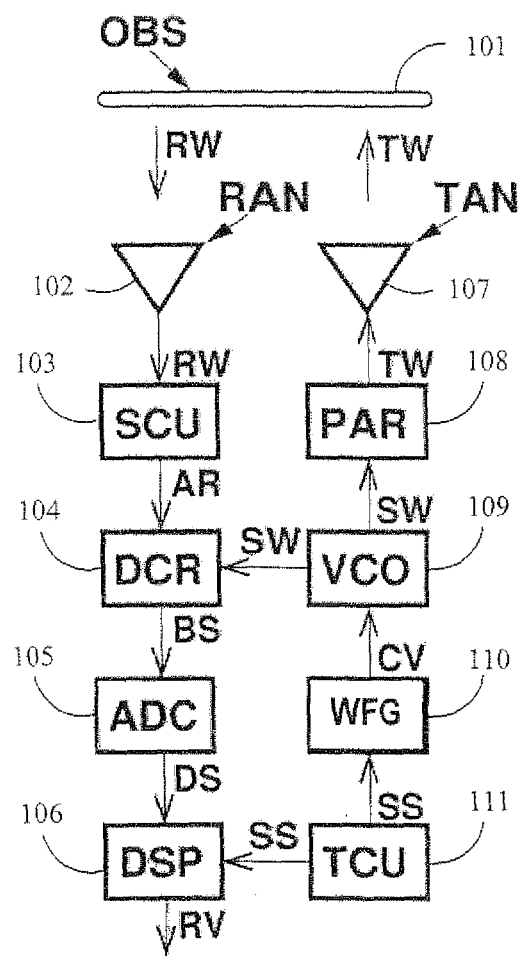
FIG. 1 is a simplified functional block diagram of conventional FMCW automotive radar.

In active mode, the automotive radar may perform the usual operations of a known system, such as that shown in FIG. 1. However, in the active mode, blanking is also applied to data within received signals to improve the determination of a range and/or velocity of an object.

Passive Mode

The radar system remains in the passive, or 'listen-only', operating mode so long as the mode switch PAS 207 is blocking the signal path between the voltage-controlled oscillator VCO 109 and the power amplifier/driver PAR 108.

In the passive mode, the radar antenna TAN 102 does not transmit any frequency sweeps. However, such sweeps SW are still generated by the VCO 109 and applied to the down-converter DCR 104.

The mode switch PAS 207 is controlled by a signal AP provided by the timing/control/arithmetic unit TCA 206.

During the passive operating mode, both the Fourier signal processor FFT 205 and the blanking circuit BLR 204 remain idle.

The TCA unit 206 selects sequentially different frequency sweeps SW by applying suitable signals SS to the waveform generator WFG 110 that, in response, produces corresponding control signals CV. As a result, the voltage-controlled oscillator VCO 109 generates a sequence of distinct frequency sweeps SW, each sweep being characterized by its:
  start frequency
  stop frequency
  sweep duration.

For ranking purposes to be described below, each different frequency sweep SW is identified by a sweep index $n \in \{1, \ldots, N\}$.

The radar senses the multiuser 'dense-signal' environment by processing signals captured by its receive antenna RAN 102. A received signal RW comprises background noise and signals transmitted by other automotive radars operating in the same region. The representation AR of the received signal RW is processed jointly in the down-converter DCR 104 with each of N frequency sweeps SW supplied by the voltage-controlled oscillator VCO 109.

Output signal BS of the down-converter DCR 104, after conversion to a digital form in the analogue-to-digital converter ADC 201, is stored in the buffer/slicer FRM 202. Each data frame stored in the buffer/slicer FRM 202 will uniquely correspond to one of the N different frequency sweeps SW applied to the down-converter DCR 104.

Each data frame is 'sliced' into a number J of data blocks DB in response to a control signal FS supplied by the TCA unit 206. The resulting data blocks DB are then applied sequentially to the interference classifier ICR 203 in response to a signal JJ provided by the TCA unit 206.

The classifier ICR 203 identifies data blocks containing chirp interference and sends to the TCA unit 206 a signal SC indicative of the level of such interference.

As a result, the TCA unit 206 can determine the number of disrupted data blocks in the data frame and also the total disruptive energy of the multiuser interference. This information is used by the TCA unit to rank the N frequency sweeps SW according to their resistance to the multiuser interference.

Accordingly, during the passive operating mode, all N available frequency sweeps SW are evaluated from a viewpoint of resistance to multiuser chirp interference. The TCA unit 206 then selects the best M sweeps to construct a sweep pattern, or patterns, that will offer good ranging performance in the multiuser environment under test.

Once the M sweeps to be used in a sweep pattern have been selected, a sweep pattern may be constructed in many ways. For example, a random, or pseudorandom, permutation of the sweeps may be utilised.

FIG. 3*a*) is a flow chart summarising the processing operations performed by the automotive radar system of the present embodiment to determine a sweep pattern.

Referring to FIG. 3*a*), at step S3 one or more signals comprising burst noise and/or frequency chirp signals from other sources in the multiuser environment are received.

The process then proceeds to step S5 at which a frequency sweep signal is generated. The frequency sweep signal is different from any other frequency sweep signal that has been generated for the current passive mode operation.

The process then proceeds to step S7 at which the frequency sweep signal is combined with a received signal to generate a combined signal for the frequency sweep signal.

The process then proceeds to step S9 at which the type of noise in the combined signal is determined. If the combined signal corresponds to a received signal comprising a frequency chirp signal, the noise level of the combined signal is determined.

The process then proceeds to step S11 at which a determination is made if further frequency sweep signals are to be generated for the current passive mode operation.

For example, a predetermined number of frequency sweep signals to be generated in a passive mode operation may be set. The process then returns back to step S3 and the processing operations at steps S3-S11 are repeated until the predetermined number of frequency sweep signals for the passive mode operation have been generated.

When all of the frequency sweep signals for the current passive mode operation have been generated, the process proceeds to step S13.

At step S13, a plurality of frequency sweep signals are then selected in dependence upon the combined signals identified at step S9 as corresponding to a signal containing a frequency chirp signal and their measured noise levels. More particularly, a predetermined number of the frequency sweep signals that generated the identified combined signals are selected, with the selected frequency sweep signals being those with the lowest measured noise levels.

The process then proceeds to step S15 at which a sweep pattern to be transmitted as an output radar waveform is generated from the selected plurality of frequency sweep signals.

In the above embodiment, after the processing at step S11 determines that the predetermined number of frequency sweep signals have not yet been generated, the processing returns to step S3, at which a new signal is received. Accordingly, each frequency sweep signal generated in step S5 is combined, in step S7, with a respective received signal. That is, a different received signal is combined with each frequency sweep signal.

In an alternative embodiment, the signal received in step S3 is stored, and after the processing at step S11 determines that the predetermined number of frequency sweep signals have not yet been generated, the processing returns to step S5. In this way, at step S7, each frequency sweep signal is then combined with the same stored received signal to generate combined signals.

It will therefore be understood that the processing performed at step S9 identifies combined signals corresponding to one or more received signals comprising frequency chirp signals (that is, one received signal if the signal received at step S3 is stored, and more than one signal if a new signal is used for each frequency sweep signal).

Advantageously, the combination of the received signal with a plurality of frequency sweep signals can be performed as a parallel operation. This decreases the duration of a passive mode operation.

Active Mode

After the passive mode, the active mode is initiated by the TCA unit 206 applying a suitable control signal, AP, to the mode switch PAS 207.

In the active mode, the radar transmits, via its antenna TAN 107, one or more sweep patterns that have been determined in the passive mode.

In the active mode, the interference classifier ICR 203 remains idle and 'transparent' to data blocks DB stored in the buffer/slicer FRM 202.

Since the one on more sweep patterns used in the active mode have been constructed so as to have good performance in the environment under test in the passive mode, the automotive FMCW radar operates with improved resistance to multiuser interference.

Although selecting the best sweep pattern reduces the effects of mutual interference, the interference may not be eliminated completely. Therefore, the ranging performance of the automotive FMCW radar is further improved by incorporating a blanking circuit BLR 204 between the buffer/slicer FRM 202 and the Fourier signal processor FFT 205.

The operation of the blanking circuit BLR 204 is described below.

A mean level, such as an rms value, of all J data blocks of a data frame is first determined. An interference detection threshold, referred to herein as a blanking threshold, is established. For example, the threshold value may be set at four times the data rms value. Preferably, the threshold value is set so as to exceed a fixed multiple (e.g., ten) of the system's noise level.

Next, each of J data blocks is tested. If the rms value of a block under test exceeds the blanking threshold, the data block is replaced with an all-zero block. As a result, the blanking circuit BLR 204 will transfer to the Fourier signal processor FFT 205 a modified data frame ZF with all corrupted data blocks substituted by all-zero blocks. It should be noted that such operation will not change the order in which individual data blocks occur in a data frame.

Because the blanking operation will reduce the background noise level, the signal detection threshold used by the Fourier signal processor FFT 205 should also be reduced. Accordingly, the blanking circuit BLR 204 sends a suitably reduced threshold value DT to the processor FFT 205. The modified threshold value DT is proportional to the number of original data blocks retained in the data frame.

The Fourier signal processor FFT 205 receives a signal SS indicative of each frequency sweep parameters: its start time, sweep duration $T_S$ and swept frequency band $\Delta f$.

The Fourier signal processor 205, which may be implemented by a DSP, is arranged to perform a calculation of the range R and/or velocity V of an object.

The automotive FMCW radar may be arranged so that it alternates between the passive and active modes after an operation of each mode, or it may be arranged so that the passive mode is used less frequently.

FIG. 3*b*) is a flowchart summarising the processing operations performed by the automotive radar system of the present embodiment in the active mode.

Referring to FIG. 3*b*), at step S21 a radar waveform comprising frequency sweeps defined by a sweep pattern determined in a passive mode operation is transmitted from the automotive radar system.

The process then proceeds to step S23 at which a reflection of the transmitted radar waveform is received.

The process then proceeds to step S25 at which the received signal is combined, in a conventional way, with the sequence of sweeps as transmitted previously at step S21 to generate a plurality of combined signals, namely one for each frequency sweep. Frames of digital data are stored, with each frame corresponding to a respective combined signal.

The process then proceeds to step S27, at which each frame is divided into data blocks, and thereafter to step S29, at which each frame is processed to determine the noise levels of data blocks in the frame.

The process then proceeds to step S31, at which blanking is applied to the digital data of each data block for which the noise level of the data block is above a predetermined level for its frame.

The process then proceeds to step S31, at which the range and/or velocity of an object is determined in dependence upon the frames, including the frames that have had blanking applied to them.

The process then proceeds to step S33, at which the active mode ends.

The process may be arranged to automatically return to step S19 to start a new active mode operation or to return to step S1 in FIG. 3*a*) to start a new passive mode operation.

Interference Classifier

Different interference classifiers that can be used as the interference classifier ICR 203 in the embodiment of FIG. 2 above will now be described.

It should be noted that neither the duration nor the power of observed transient interference can provide any useful information regarding the type of such interference, and therefore an interference classifier operating on different principles must be used.

A first type of interference classifier ICR 203, that is suitable for use in the above-described embodiment, performs processing to identify frequency chirp interference by determining a value of kurtosis from a set of samples under examination.

Kurtosis is defined as the ratio of the fourth central moment to the square of the second central moment. Accordingly, in a case of K zero-mean signal samples, $x_1, x_2, \ldots, x_k, \ldots, x_K$, an empirical kurtosis $K_X$ can be determined from:

$$K_X = \left(\frac{1}{K}\sum_{k=1}^{K} x_k^4\right)\left[\left(\frac{1}{K}\sum_{k=1}^{K} x_k^2\right)^{-2}\right] \quad \text{Eqn. 4}$$

For noise, modelled by a random Gaussian process, the kurtosis is equal to three, independent of the noise level. However, in the case of randomly sampled sine wave of any amplitude, the kurtosis is equal to 1.5. Therefore, the first type of interference classifier ICR 203 compares the value of empirical kurtosis, determined from a set of samples under examination, to a predetermined threshold to decide whether the set is more likely to represent noise or rather a randomly sampled sine wave.

An improved second type of interference classifier, which has been devised by the present inventor and which can be employed as the interference classifier ICR 203 in the embodiment of FIG. 2 above, will now be described.

First, the underlying theory behind the improved interference classifier is provided.

Consider a received signal that comprises standard background noise (e.g. thermal noise) and pulse-like high-level interference (i.e. transient interference). Such transient interference may have originated either from a short burst of wideband noise or from a pulse with frequency-modulated carrier (a chirp).

In systems employing discrete-time signal processing, a noise burst will produce a sequence of samples having a Gaussian distribution, whereas a frequency chirp will generate samples with the same characteristics as those obtained by random sampling of a constant-amplitude sinusoidal wave. This observation can be exploited in many different ways to develop a statistical procedure for discriminating between noise bursts and chirps. However, as noted above, neither duration nor the power of observed transient interference can provide any useful information regarding the type of such interference.

From a statistical point of view, the problem of discriminating between a noise burst B and a frequency chirp C is equivalent to selecting one of two alternative hypotheses, H0 and H1, where:

H0=noise burst B present
H1=chirp C present

Accordingly, K signal samples $x_1, x_2, \ldots, x_k, \ldots x_K$ are characterized by one of two conditional probability density functions, namely:

under hypothesis $H0: p(x_k|B), k=1, 2, \ldots, K$     Eqn. 5 under hypothesis $H1: p(x_k|C), k=1, 2, \ldots, K$     Eqn. 6

Hypothesis H1 will be selected when the likelihood ratio, $L(x_1, x_2, \ldots, x_K)$, exceeds some predetermined decision threshold level.

The likelihood ratio is defined as:

$$L(x_1, x_2, \ldots, x_K) \triangleq \prod_{k=1}^{K} \frac{p(x_k|C)}{p(x_k|B)} \quad \text{Eqn. 7}$$

In practice, it is more convenient to utilise an equivalent procedure based on the log-likelihood ratio, ln L, where:

$$\ln L = \frac{1}{K} \sum_{k=1}^{K} [\ln p(x_k|C) - \ln p(x_k|B)] > T_X \quad \text{Eqn. 8}$$

where $T_X$ is a predetermined decision threshold.

The level of interference to be classified cannot be known a priori.

The present interference classifier ICR 203, however, provides a greatly improved practical procedure for discriminating between frequency chirps and noise bursts by first normalising the signal samples, as will be described below.

Normalisation Utilising Mean Absolute Deviation—Robust Classifier

In accordance with one form of normalisation, a data block of suitable extent is selected from available data, and K signal samples $x_1, x_2, \ldots, x_k, \ldots, x_K$ in the block are used to determine the mean absolute deviation as follows:

$$M_A = \frac{1}{K} \sum_{k=1}^{K} |x_k| \quad \text{Eqn. 9}$$

The extent of the data block is so chosen as to capture a substantial portion of the shortest expected transient interference. When the mean absolute deviation $M_A$ exceeds a predetermined decision threshold, $T_N$, the presence of interference is declared.

Preferably, the decision threshold $T_N$ is set at about three or four times greater than the rms (root-mean-squared) value $\sigma_N$ of background noise.

In the case of a noise burst B, the mean absolute deviation tends to:

$$M_A = \sqrt{\frac{2}{\pi}} \sigma_B \approx 0.8 \sigma_B \quad \text{Eqn. 10}$$

where, $$\sigma_B = \sqrt{\sigma_O^2 + \sigma_N^2} \quad \text{Eqn. 11}$$

$\sigma_B$ is the rms value of the sum of background noise and burst noise with respective variances $\sigma_N^2$ and $\sigma_O^2$.

When a chirp C with amplitude A is observed, and the level of background noise is low (say, $\sigma_N < A/5$), the mean absolute deviation $M_A$ is approximately equal to:

$$M_A \approx \frac{2A}{\pi} \quad \text{Eqn. 12}$$

It is noted that, in practice, both the parameters, $\sigma_B$ and A, are unknown.

The primary sequence $\{x_k\}$ of samples is converted into a corresponding secondary sequence $\{y_k\}$ by using a normalising transformation:

$$y_k = \frac{|x_k|}{M_A}, k = 1, 2, \ldots, K \quad \text{Eqn. 13}$$

The purpose of the above transformation is to make the observations $\{y_k\}$ independent of the unknown parameters $\sigma_B$ and A.

In the case of a noise burst B, samples $\{y_k\}$ will represent realizations of a Gaussian non-negative random variable with probability density function of the form:

$$p(y|B) = \frac{2}{\pi} \exp\left(-\frac{y^2}{\pi}\right), y \geq 0 \quad \text{Eqn. 14}$$

When a chirp C is observed, the probability density function p(y|C) can be expressed in a closed form only when background noise is negligible, i.e., when $A \gg \sigma_N$. In such a case:

$$p(y|C) = \frac{4}{\pi\sqrt{\pi^2 - 4y^2}}, 0 \leq y \leq \frac{\pi}{2} \quad \text{Eqn. 15}$$

On the other hand, when background noise is present, p(y|C) can be regarded as a representation of the underlying ordinary probability density function, $p_0(y)$ when diffusing effects of added noise are taken into account, where $$p_0(y) = \frac{4}{\pi\sqrt{\pi^2 - 4y^2}}, \ 0 \le y \le \frac{\pi}{2}.$$

The discrepancy between the shape of the representation p(y|C) and that of the underlying probability density function $p_0(y)$ will increase for higher levels of added noise.

FIG. 4 depicts the shapes of a probability density function p(y|C) that represents $p_0(y)$ for selected values of noise level (in this case the ratio $A/\sigma_N$). Each plot has been obtained from a Monte Carlo computer study utilising $10^8$ replications, although it will be appreciated that other representations of $p_0(y)$ can be used to produce a probability density function dependent upon noise level. As can be seen, when the argument y approaches zero, the density functions assume values close to the limit of $4/\pi^2 \approx 0.4$, as predicted by Equation 15.

For comparison purposes, FIG. 4 also shows the probability density function p(y|B) of a noise burst B.

The log-likelihood ratio is defined as:

$$\ln L = \frac{1}{K}\sum_{k=1}^{K}[\ln p(y_k | C) - \ln p(y_k | B)] \qquad \text{Eqn. 16}$$

The presence of a frequency chirp C will be declared when the log-likelihood ratio, as defined in Equation 16, exceeds a predetermined decision threshold. Otherwise, the samples being processed will be classified as those representing a noise burst B.

Alternatively, the presence of an interfering chirp C will be declared when a suitable decision threshold, $T_{CG}$, has been exceeded by the average $G_K$ of K nonlinearly transformed samples $y_1, y_2, \ldots, y_k, \ldots, y_K$, as shown in Equation 17:

$$G_K \triangleq \frac{1}{K}\sum_{k=1}^{K}D(y_k) > T_{CG} \qquad \text{Eqn. 17}$$

where, the nonlinear transform, D(y), is a suitable representation of the function $[\ln p(y_k|C) - \ln p(y_k|B)]$, appearing in Equation 16.

In the following, an interference classifier utilising normalisation based on mean absolute deviation will be referred to herein as a robust interference classifier.

The nonlinearity, D(y), can only be expressed in a closed form when background noise is negligible, i.e. when $\Psi = A/\sigma_N \to \infty$. In such a case:

$$\lim_{\Psi \to \infty} D(y) = \ln 2 - \frac{1}{2}\ln(\pi^2 - 4y^2) + \frac{y^2}{\pi}, \ 0 \le y \le \frac{\pi}{2} \qquad \text{Eqn. 18}$$

FIG. 5 depicts the shapes of nonlinearity, D(y), for selected values of the ratio $A/\sigma_N$. Each plot has been obtained from a Monte Carlo computer study utilising $10^8$ replications.

When the argument y approaches zero, the nonlinearity, D(y), assumes values close to the limit, $\ln(2/\pi) \approx -0.45$, predicted from the above equation. For comparison purposes, FIG. 5 also shows the nonlinearity D(y) for negligible background noise, i.e. when $A/\sigma_N \to \infty$.

As will be seen from FIG. 5, the shapes of the nonlinearity, D(y), are substantially the same for the different values of $A/\sigma_N$, with the maximum value of D(y) increasing as the value of $A/\sigma_N$ increases. In all cases, the maximum value occurs for values of y in the range 1.4 to 1.7.

In accordance with a further feature of the present interference classifier, the nonlinearity, D(y), is approximated by a superposition of two standard functions, namely, a Lorentz function and a parabola.

Irrespective of the ratio $A/\sigma_N$, the nonlinearity, D(y), can be viewed as being composed of two branches that merge at the peak of D(y). The left branch of D(y) can be approximated by a portion of a down-shifted Lorentz function of the form:

$$D(y) \approx \frac{\beta}{(y-\alpha)^2 + \varepsilon} - \delta, \ 0 < y < y_0 \qquad \text{Eqn. 19}$$

The right branch can be represented by a portion of a parabola:

$$D(y) \approx -ay^2 + by - c, \ y_0 \le y \le \infty \qquad \text{Eqn. 20}$$

For example, when $A/\sigma_N = 10$, it is possible to achieve a good approximation with the following parameter values:

$y_0 = 1.54; \ \alpha = 1.5, \ \beta = 0.3, \ \epsilon = 0.182, \ \delta = 0.57; \ a = 16.36, \ b = 49.55, c = 36.446$ FIG. 6 depicts a nonlinearity, D(y), for $A/\sigma_N = 10$ and also its approximation constructed in accordance with the present interference classifier 203 using the combination of a Lorentz function and a parabola.

It will be understood that the nonlinearity, D(y), can be approximated in many different ways. However, each approximation will attempt to represent and mimic, in some sense, the general shape of nonlinearities depicted in FIG. 5. For example, the left branch can be approximated with a straight line and the right branch can be approximated with a different straight line.

Therefore, in each case, the approximating function will exhibit a peak, or a plateau, at a transition value comprising an argument value of $$\frac{\pi}{2}$$

when there is no noise or between approximately 1.4 and 1.7 when noise is present (the argument value deviating from $$\frac{\pi}{2}$$

due to the diffusing effects of the noise, with the amount of deviation dependent upon the amount of noise). For argument values not exceeding the transition value, the approximating function will be a non-decreasing function. Furthermore, for argument values equal to, or greater than, the transition value, the approximating function will be a decreasing function. In general, the steepness of this falling portion will be much greater than that of the non-decreasing portion, preceding the peak (or plateau).

Normalisation Utilising Standard Deviation—Optimal Classifier

The application of mean absolute deviation in the normalising procedure can be regarded as a practical and also statistically robust approach. However, from a theoretical point of view, the use of standard deviation for this purpose may be preferred.

Therefore, in accordance with a further form of the interference classifier 203, a primary sequence $\{x_k\}$ of observed samples is converted into a corresponding secondary sequence $\{y_k\}$ by applying a normalising transformation:

$$y_k = \frac{|x_k|}{S_n}, k = 1, 2, \ldots, K \quad \text{Eqn. 21}$$

where $S_D$ is the standard deviation determined from:

$$S_D = \sqrt{\frac{1}{K}\sum_{k=1}^{K} x_k^2} \quad \text{Eqn. 22}$$

In the case of a noise burst B, the standard deviation $S_D$ is simply equal to $\sigma_B$, i.e. the rms value of the sum of background noise and burst noise (see Equation 11). When a chirp C with amplitude A is observed, and the level of background noise is low (say, $\sigma_N < A/5$), the rms value is approximately equal to:

$$S_D \approx \frac{A}{\sqrt{2}} \quad \text{Eqn. 23}$$

In the case of a noise burst B, samples $\{y_k\}$ represent realizations of a Gaussian non-negative random variable with probability density function:

$$p(y|B) = \sqrt{\frac{2}{\pi}} \exp\left(-\frac{y^2}{2}\right), y \geq 0 \quad \text{Eqn. 24}$$

When a chirp C is observed, the probability density function $p(y|C)$ can be expressed in a closed form only when background noise is negligible, i.e., when $A/\sigma_N \gg 1$. In such a case:

$$p(y|C) = \frac{2}{\pi\sqrt{2-y^2}}, 0 \leq y \leq \sqrt{2} \quad \text{Eqn. 25}$$

On the other hand, when background noise is present $p(y|C)$ can be regarded as a representation of the underlying ordinary probability density function $p_0(y)$ when diffusing effects of added noise are taken into account, where $$p_0(y) = \frac{2}{\pi\sqrt{2-y^2}}, 0 \leq y \leq \sqrt{2}.$$

The discrepancy between the shape of the representation $p(y|C)$ and that of the underlying probability density function $p_0(y)$ will increase for higher levels of added noise.

As in the case of the robust classifier described above, a Monte Carlo computer simulation can be used to produce a representation $p(y|C)$ for a selected value of noise level. Alternatively, other forms of representation may be used.

Accordingly, the presence of an interfering chirp C will be declared when a predetermined decision threshold $T_{CH}$ has been exceeded by the average $H_K$ of K nonlinearly transformed samples $y_1, y_2, \ldots, y_k, \ldots, y_K$, as shown in Equation 26.

$$H_K \triangleq \frac{1}{K}\sum_{k=1}^{K} V(y_k) > T_{CH} \quad \text{Eqn. 26}$$

where the nonlinear transform $V(y)$ is a suitable representation of the function $[\ln p(y_k|C) - \ln p(y_k|B)]$.

In this case, the nonlinearity $V(y)$ has a shape different from that exhibited by the nonlinearity, $D(y)$, described previously.

In the following, an interference classifier utilising normalisation based on standard deviation will be referred to herein as optimal interference classifier, to reflect the fact that for a Gaussian random variable its standard deviation is the best estimator of scale.

The nonlinearity, $V(y)$, can be expressed in a closed form only when background noise is negligible, i.e. when $\Psi = A/\sigma_N \to \infty$. In such a case:

$$\lim_{\Psi \to \infty} V(y) = \frac{1}{2}\ln\left(\frac{2}{\pi}\right) - \frac{1}{2}\ln(2-y^2) + \frac{y^2}{2} \quad \text{Eqn. 27}$$

$$0 \leq y \leq \sqrt{2}$$

FIG. 7 depicts the shapes of nonlinearity, $V(y)$, for selected values of the ratio $A/\sigma_N$. Each plot has been obtained from a Monte Carlo computer study utilising $10^8$ replications.

When the argument y approaches zero, the nonlinearity, $V(y)$, assumes values close to the limit, $-(\ln \pi)/2 \approx 0.57$, predicted from Equation 27.

For comparison purposes, FIG. 7 also shows the nonlinearity $V(y)$ for negligible background noise, i.e. when $A/\sigma_N \to \infty$.

As will be seen from a comparison of FIG. 7 with FIG. 5, the shapes of the two nonlinearities, $D(y)$ and $V(y)$, are substantially the same. In the case of the nonlinearities $V(y)$, however, the maximum value occurs for a value of y at $\sqrt{2}$ when there is no noise or a value in the approximate range 1.3 to 1.6 when noise is present (the argument value deviating from $\sqrt{2}$ due to the diffusing effects of the noise, with the amount of deviation dependent upon the amount of noise), whereas the maximum value of $D(y)$ occurs at a value of $$\frac{\pi}{2}$$

when there is no noise or occurs in the range 1.4 to 1.7 when noise is present.

FIG. 8 shows the two nonlinearities, $D(y)$ and $V(y)$, for the case when $A/\sigma_N = 10$. Although both the nonlinearities have similar shapes, the nonlinearity $V(y)$ appears to be superior to $D(y)$ as it seems to offer a better discrimination for the range of arguments of interest.

According to a further feature of the present interference classifier utilising normalisation based on standard deviation, an approximation of the nonlinear function V(y) is applied.

More particularly, the left branch and right branch of V(y) are approximated, respectively, by a portion of a downshifted Lorentz function:

$$v(y) \approx \frac{\beta}{(y-\alpha)^2 + \varepsilon} - \delta, \; 0 < y < y_0 \qquad \text{Eqn. 28}$$

and by a portion of a parabola:

$$V(y) \approx -ay^2 + by - c, \; y_0 \leq y < \infty \qquad \text{Eqn. 29}$$

For example, when $A/\sigma_N = 10$, a good approximation has been achieved for the following parameter values:

$y_0 = 1.45$; $\alpha = 1.365$, $\beta = 0.361$, $\varepsilon = 0.1871$, $\delta = 0.77$; $a = 17.82$, $b = 47.41$, $c = 30.21$ As with D(y), different functions other than a Lorentz function and a parabola can be used to approximate V(y). As these have been described above, they will not be described again here.

Other Normalisation Methods

For normalisation purposes in the interference classifier 203 shown in FIG. 2, other measures of the mean signal level such as geometric mean, median or trimmed mean can be used to normalise the signal samples.

A geometric mean, $M_G$, of K signal samples $|x_1|$, $|x_2|$, ..., $|x_k|$, ..., $|x_K|$ is defined by:

$$M_G \overset{\Delta}{=} \sqrt[K]{|x_1| \cdot \ldots \cdot |x_K|} \qquad \text{Eqn. 30}$$

For normalisation purposes, median or trimmed mean can be determined from K signal samples ordered in an ascending order, such that:

$$|x|_{(1)} \leq |x|_{(2)} \leq \ldots |x|_{(k)} \leq \ldots |x|_{(K)}$$

Then, the sample median is equal to a middle sample, if K is an odd number; otherwise, when K is even, the sample median equals an arithmetic mean of two middle samples.

A trimmed mean, $M_L$, is obtained by discarding L largest samples and determining the arithmetic mean of the retained samples, hence:

$$M_L = \frac{1}{K-L} \sum_{k=1}^{K-L} |x|_{(k)} \qquad \text{Eqn. 31}$$

There are still other measures of the mean signal level that can be exploited for normalisation purposes.

Whatever measure of the mean signal level is used to perform normalisation, the resulting nonlinearities will have the same form and properties as the nonlinearities D(y) and V(y) described above. Thus, each nonlinearity will have a maximum value at a transition value comprising a value of y between 1.3 and 1.7, and can be approximated by a non-decreasing function for values of y not exceeding the transition value and a decreasing function for values of y at or greater than the transition value. In all cases, the magnitude of the mean slope of the decreasing function will be greater than that of the non-decreasing function.

Example Configuration

An example configuration of an interference classifier ICR 203 for implementing the above-described advantageous interference classification is described below.

FIG. 9 is a functional block diagram of the interference classifier ICR 203. The classifier ICR 203 comprises the following blocks:
 a data buffer BFR 802
 a normaliser NRM 804
 a scale factor calculator SCL 803
 a nonlinear transformer NLT 805
 an averaging circuit AVG 806
 a comparator CMR 807.

The operation interference classifier ICR 203 is described below.

A number K of signal samples $x_1, x_2, \ldots, x_k, \ldots, x_K$ forming a data block under examination are transferred via input BX to the data buffer BFR 802.

Samples, available at output XX are used by the scale factor calculator SCL 803 to determine a scale factor SC, such as the mean absolute deviation $M_A$ or the standard deviation $S_D$. The selected type of normalisation is set via input ST of the scale factor calculator SCL 803.

The classifier ICR 203 can be configured, for example, to operate as either the robust classifier or the optimal classifier as described earlier.

The scaling factor SC, determined by the block SCL 803, is supplied to the normaliser NRM 804 to calculate K normalised samples of a secondary sequence:

$$y_1 = \frac{|x_1|}{SC}, y_2 = \frac{|x_2|}{SC}, \ldots, y_k = \frac{|x_k|}{SC}, \ldots, y_K = \frac{|x_K|}{SC} \qquad \text{Eqn. 32}$$

where the normalised samples $y_1, y_2, \ldots, y_K$ respectively correspond to the primary signal samples $x_1, x_2, \ldots, x_k, \ldots, x_K$ received via input XK from the data buffer BFR 802.

The nonlinear transformer NLT 805 utilises each normalised sample $y_k$, appearing at input YK, to determine a corresponding value, such as $D(y_k)$ or $V(y_k)$, as discussed above.

The nonlinear transformer NLT 804 receives two parameters, namely the type of nonlinearity ST (corresponding to the selected method of normalisation) and a nominal value, AN, of the ratio of chirp amplitude A and an rms value $\sigma_N$ of background noise.

A default value of $A/\sigma_N = 10$ may be automatically chosen as the nominal value of AN. Alternatively, a suitable value of AN can be determined as follows.

Assume that for a reliable operation of the system incorporating the interference classifier, the level of a signal being processed should be at least g1 times greater than the rms value $\sigma_N$ of background noise. Assume also that a signal having such a minimum level of $(g1 \cdot \sigma_N)$ will be distorted in a destructive way when the smallest amplitude A of sinusoidal interference is g2 times greater than this minimum level; hence, $A = g2 \cdot (g1 \cdot \sigma_N)$ and $AN \Delta A/\sigma_N = g2 \cdot g1$. For example, if $g1 = 5$ and $g2 = 2$, then $AN = A/\overline{\sigma}_N = 10$.

Furthermore, as seen from FIG. 5 and FIG. 7, the shape of the respective nonlinearities, D(y) and V(y), does not change significantly when $A/\sigma_N$ increases from, say, 10 to 20. Also, sinusoidal interference with larger values of amplitude A can always be detected more reliably. Therefore, the nominal value of AN used by the classifier is preferably selected so as to correspond to lower operational values of the ratio $A/\sigma_N$.

The averaging circuit AVG 806 determines the average, GH, of the nonlinearly-transformed normalised samples received at input VD.

The calculated average OH is compared to a decision threshold CT in the comparator CMR 807. When the decision threshold CT has been exceeded by the average GH, the presence of interfering chirp will be declared. Otherwise, the samples being processed will be classified as those representing an interfering burst of noise.

The decision about the class of interference, noise burst B or frequency chirp C, is provided at output BC of the comparator CMR 807. Additionally, output SC provides the scale factor indicative of the level of interference being classified.

An extensive Monte Carlo simulation study has shown that the interference classifier of the second type described above can outperform a kurtosis-based classifier of the first type described above.

For example, for K=16 samples per data block and false-alarm probability fixed at PFA=0.01, the decision threshold CT and the probability of detection PD for each classifier are given below:

|    | kurtosis | robust | optimal |
|----|----------|--------|---------|
| PD | 0.57     | 0.62   | 0.64    |
| CT | 1.57     | 0.234  | 0.243   |

In the above context, probability of detection PD is the probability of deciding "chirp C present" when, indeed, a chirp C is present; false-alarm probability PFA is the probability of deciding "chirp C present", when, in fact, a noise burst B is present.

Each value given above has been obtained from a Monte Carlo computer study utilising $10^6$ replications. As seen, the robust and optimal versions of the second type of interference classifier offer, respectively, 5% and 7% improvement in detection probability PD with respect to a kurtosis-based classifier.

Illustrative Example

In order to facilitate the understanding of the advantages of the automotive radar according to embodiments of the invention, an example is set out below.

Consider a beat signal comprising three sine waves of different frequencies and background noise of unit rms value. The amplitude of each sine wave is equal to 0.27; such a case may, for example, represent three very small objects appearing in the field-of-view (FOV) of an automotive radar.

FIG. 10a) depicts a data frame containing 512 samples representing the beat signal. Although the sine waves are well buried in noise, the corresponding frequency components are clearly visible in a frequency-domain representation shown in FIG. 10b).

FIG. 11a) shows the same data frame but additionally corrupted by three high-level frequency chirps, each having the same amplitude of 25. For comparison, a blanking-threshold level BTH is also shown. In this case, a frequency-domain representation depicted in FIG. 11b) is dominated by a plurality of frequency components of interfering chirps, and frequency components of interest are not detectable.

An attempt to apply the blanking procedure fails in this case, as seen from FIG. 12a) and FIG. 12b) that depict, respectively, a data frame modified by a blanking operation that has removed the high-level frequency chirps and the frequency-domain representation of the data frame.

FIG. 13a) shows a corresponding data frame when a frequency sweep transmitted by the automotive radar has been suitably shifted in frequency (i.e. a different sweep pattern is used), and one of the three interfering chirps has been avoided. However, in the frequency-domain representation shown in FIG. 13b), the frequency components of interest are still difficult to detect.

To improve detection, blanking is applied to the data frame shown in FIG. 13a) with a suitable blanking-threshold level BTH, such that as shown in FIG. 13a). The modified data frame is depicted in FIG. 14a) and contains two all-zero data blocks that have replaced original blocks corrupted by interfering chirps.

A frequency-domain representation of the modified data frame, shown in FIG. 14b), clearly reveals the presence of the desired three frequency components, all above the detection threshold.

In the above example, blanking alone was not sufficient to suppress effects of multiuser interference. However, by using adaptive selection of transmitted frequency sweeps together with signal blanking, reliable detection was achieved.

However, in alternative scenarios, adaptive selection of transmitted frequency sweeps alone may be sufficient to achieve reliable detection, without further requiring signal blanking.

Modifications and Variations

Many modifications and varieties can be made to the embodiments described above.

For example, the embodiment shown in FIG. 2 comprises hardware components. However, an embodiment may be implemented using software, firmware or any combination of software, firmware and hardware. For example, FIG. 15 shows an embodiment in which the interference classifier ICR 203, blanking circuit BLR 204, Fourier signal processor FFT 205, timing/control/arithmetic unit TCA 206 and waveform generator WFG 110 are all implemented by a programmable processing apparatus 1503 programmed by computer program instructions to perform the processing operations previously described. The computer program instructions are provided, for example, on a computer program product such as storage medium 1501 or signal 1502.

The foregoing description of embodiments of the invention has been presented for the purpose of illustration and description. It is not intended to be exhaustive or to limit the invention to the precise form disclosed. In light of the foregoing description, it is evident that many alterations, modifications, and variations will enable those skilled in the art to utilise the invention in various embodiments suited to the particular use contemplated.

The invention claimed is:

1. An automotive radar system operable to determine a sweep pattern to be transmitted as an output radar waveform in a multiuser transmission environment, the system comprising:
    a receiver operable to receive noise signals comprising burst noise, frequency chirp signals generated by one or more other users in the environment, or a combination thereof;
    a signal generator operable to generate a plurality of different frequency sweep signals;
    a signal combiner operable to combine each frequency sweep signal with a received noise signal to generate a combined signal for each frequency sweep signal;
    an interference classifier operable to identify combined signals corresponding to one or more received noise signals comprising frequency chirp signals and to determine the respective noise levels of the identified combined signals corresponding to one or more received noise signals comprising frequency chirp signals;

a selector operable to select a plurality of frequency sweep signals in dependence upon the noise levels determined by the interference classifier; and a control unit operable to determine a sweep pattern comprising the selected plurality of frequency sweep signals to be transmitted as an output radar waveform.

2. An automotive radar system according to claim 1 further comprising:

a transmitter operable to transmit the determined sweep pattern as an output radar waveform; and a switch operable to switch the operation of the automotive radar system between a passive mode and an active mode;

wherein:

in the passive mode, the automotive radar system is arranged to determine a sweep pattern from one or more received noise signals; and in the active mode, the automotive radar system is arranged to transmit a radar waveform signal comprising frequency sweeps defined by the sweep pattern determined in the passive mode and to process received signals comprising a reflection of the transmitted radar waveform.

3. An automotive radar system according to claim 2 wherein the system further comprises:

a buffer configured to store frames of digital data with each frame corresponding to a combined signal for a respective frequency sweep signal; and a blanking circuit operable to apply blanking to the digital data of a frame;

wherein:

in the active mode, the blanking circuit is operable to process a frame corresponding to a combined signal for a frequency sweep signal to divide the frame into data blocks, to determine a noise level of the data blocks within the frame and, if the noise level of a data block is above a predetermined level, then to applying blanking to the data block; and the automotive radar system is arranged to detect at least one of the range and velocity of an object in dependence upon a frame with blanking applied to it.

4. An automotive radar system according to claim 1 wherein:

the signal combiner is operable to combine a received signal with a frequency sweep signal in a down converter to generate a combined signal.

5. An automotive radar system according to claim 1 wherein the interference classifier is a kurtosis based interference classifier.

6. An automotive radar system according to claim 1 wherein the interference classifier is operable to process samples of a combined signal for each frequency sweep signal, and the interference classifier comprises:

a scale factor calculator operable to calculate a scale factor for the signal samples in dependence upon the levels of the signal samples;

a normaliser operable to calculate normalised signal samples, y, by using the scale factor to normalise the signal samples;

a nonlinear transformer operable to perform a nonlinear transform, T(y), on the normalised signal samples to calculate transformed signal samples;

an averaging circuit operable to calculate an average level of the transformed signal samples; and a comparator operable to compare the calculated average level of the transformed signal samples to a predetermined threshold level in order to determine whether the noise present in the combined signal comprises a frequency chirp signal;

wherein:

the nonlinear transformer is operable to perform a nonlinear transform, T(y), comprising a combination of a first function, T1(y), and a second function, T2(y), wherein the first function defines the transform to be applied to normalised signal samples having a value not exceeding a transition value, $y_t$, and the second function defines a transform to be applied to normalised signal samples having a value at or above the transition value $y_t$, and wherein:

T1(y) is a non-decreasing function with increasing normalised signal sample values;

T2(y) is a decreasing function with increasing normalised signal sample values; and the transition value, $y_t$, has a value in the range $1.3 \leq y_t \leq 1.7$.

7. An automotive radar system according to claim 6, wherein the first function T1(y) is an increasing function with increasing normalised signal sample values, and the magnitude of the mean slope of T1(y) is less than the magnitude of the mean slope of T2(y).

8. A method of determining a sweep pattern to be transmitted as an output radar waveform by an automotive radar in a multi-automotive radar environment, the method comprising:

receiving one or more noise signals comprising burst noise, frequency chirp signals generated by one or more other automotive radars in the environment, or a combination thereof;

generating a plurality of different frequency sweep signals;

combining each frequency sweep signal with a received noise signal to generate a combined signal for each frequency sweep signal;

identifying combined signals corresponding to one or more received noise signals comprising frequency chirp signals and determining the respective noise level of each identified combined signal corresponding to a received noise signal comprising frequency chirp signals;

selecting a plurality of frequency sweep signals in dependence upon the determined noise levels of the combined signals corresponding to the one or more received noise signals comprising frequency chirp signals; and determining a sweep pattern comprising the selected plurality of frequency sweep signals to be transmitted as an output radar waveform.

9. A method according to claim 8, further comprising:

transmitting the determined sweep pattern as an output radar waveform; and switching between a passive mode and an active mode;

wherein:

in the passive mode, a sweep pattern is determined from one or more received noise signals; and in the active mode, a radar waveform signal comprising frequency sweeps defined by the sweep pattern determined in the passive mode is transmitted and received signals comprising a reflection of the transmitted radar waveform are processed.

10. A method according to claim 9, wherein the active mode comprises:

storing frames of digital data with each frame corresponding to a combined signal for a respective frequency sweep signal;

processing a frame corresponding to a combined signal for a frequency sweep signal to divide the frame into data blocks and to determine a noise level of the data blocks within the frame and, if the noise level of a data block is above a predetermined level, then applying blanking to the digital data of the data block; and detecting at least one of the range and velocity of an object in dependence upon a frame with blanking applied to it.

11. A method according to claim 8 wherein the process of combining each frequency sweep signal with a received noise signal comprises down converting a received signal with a frequency sweep signal to generate a combined signal.

12. A method according to claim 8 wherein the process of identifying combined signals corresponding to received noise signals comprises frequency chirp signals is a kurtosis-based interference classification method.

13. A method according to claim 8, wherein the process of identifying a combined signal corresponding to a received noise signal comprising a frequency chirp signal comprises:
using signal samples of the combined signal to calculate a scale factor in dependence upon the levels of the signal samples;
calculating normalised signal samples, y, by using the scale factor to normalise the signal samples;
performing a nonlinear transform, $T(y)$, on the normalised signal samples to calculate transformed signal samples;
calculating an average level of the transformed signal samples;
comparing the calculated average level of the transformed signal samples to a predetermined threshold level in order to determine the type of noise present in the combined signal;
wherein:
the nonlinear transform, $T(y)$, comprises a combination of a first function, $T1(y)$, and a second function, $T2(y)$, wherein the first function defines the transform to be applied to normalised signal samples having a value not exceeding a transition value, $y_t$, and the second function defines a transform to be applied to normalised signal samples having a value at or above the transition value $y_t$, and wherein:
$T1(y)$ is a non-decreasing function with increasing normalised signal sample values;
$T2(y)$ is a decreasing function with increasing normalised signal sample values; and
the transition value, $y_t$, has a value in the range $1.3 \leq y_t \leq 1.7$.

14. A method according to claim 13 wherein, in the process of performing a nonlinear transform, the first function $T1(y)$ is an increasing function with increasing normalised signal sample values and the magnitude of the mean slope of $T1(y)$ is less than the magnitude of the mean slope of $T2(y)$.

15. A non-transitory storage medium storing computer program instructions which, when executed by a processing apparatus, cause the processing apparatus to perform processing operations to determine a sweep pattern to be transmitted as an output radar waveform by an automotive radar in a multi-automotive radar environment, the processing operations comprising:
receiving one or more noise signals comprising burst noise, frequency chirp signals generated by one or more other automotive radars in the environment, or a combination thereof;
generating a plurality of different frequency sweep signals;
combining each frequency sweep signal with a received noise signal to generate a combined signal for each frequency sweep signal;

identifying combined signals corresponding to one or more received noise signals comprising frequency chirp signals and determining the respective noise level of each identified combined signal corresponding to a received noise signal comprising frequency chirp signals;
selecting a plurality of frequency sweep signals in dependence upon the determined noise levels of the combined signals corresponding to the one or more received noise signals comprising frequency chirp signals; and
determining a sweep pattern comprising the selected plurality of frequency sweep signals to be transmitted as an output radar waveform.

16. A non-transitory storage medium according to claim 15, wherein the computer program instructions, when executed by the processing apparatus, cause the processing apparatus to perform further processing operations comprising:
transmitting the determined sweep pattern as an output radar waveform; and
switching between a passive mode and an active mode;
wherein:
in the passive mode, a sweep pattern is determined from one or more received noise signals; and
in the active mode, a radar waveform signal comprising frequency sweeps defined by the sweep pattern determined in the passive mode is transmitted and received signals comprising a reflection of the transmitted radar waveform are processed.

17. A non-transitory storage medium according to claim 16, wherein the active mode comprises:
storing frames of digital data with each frame corresponding to a combined signal for a respective frequency sweep signal;
processing a frame corresponding to a combined signal for a frequency sweep signal to divide the frame into data blocks and to determine a noise level of the data blocks within the frame and, if the noise level of a data block is above a predetermined level, then applying blanking to the digital data of the data block; and
detecting at least one of the range and velocity of an object in dependence upon a frame with blanking applied to it.

18. A non-transitory storage medium according to claim 15 wherein the process of combining each frequency sweep signal with a received noise signal comprises down converting a received signal with a frequency sweep signal to generate a combined signal.

19. A non-transitory storage medium according to claim 15 wherein the process of identifying combined signals corresponding to received noise signals comprises frequency chirp signals is a kurtosis-based interference classification method.

20. A non-transitory storage medium according to claim 15, wherein the process of identifying a combined signal corresponding to a received noise signal comprising a frequency chirp signal comprises:
using signal samples of the combined signal to calculate a scale factor in dependence upon the levels of the signal samples;
calculating normalised signal samples, y, by using the scale factor to normalise the signal samples;
performing a nonlinear transform, $T(y)$, on the normalised signal samples to calculate transformed signal samples;
calculating an average level of the transformed signal samples;
comparing the calculated average level of the transformed signal samples to a predetermined threshold level in order to determine the type of noise present in the combined signal;

wherein:
the nonlinear transform, T(y), comprises a combination of a first function, T1(y), and a second function, T2(y), wherein the first function defines the transform to be applied to normalised signal samples having a value not exceeding a transition value, $y_t$, and the second function defines a transform to be applied to normalised signal samples having a value at or above the transition value $y_t$, and wherein:

T1(y) is a non-decreasing function with increasing normalised signal sample values;

T2(y) is a decreasing function with increasing normalised signal sample values; and the transition value, $y_t$, has a value in the range $1.3 \leq y_t 1.7$.

21. A non-transitory storage medium according to claim 20 wherein, in the process of performing a nonlinear transform, the first function T1(y) is an increasing function with increasing normalised signal sample values and the magnitude of the mean slope of T1(y) is less than the magnitude of the mean slope of T2(y).

\* \* \* \* \*